United States Patent [19]
Roethler

[11] Patent Number: 6,012,204
[45] Date of Patent: Jan. 11, 2000

[54] FITTING FOR ATTACHMENT TO A ROPE

[76] Inventor: Marty B. Roethler, 4324 Morgan Ridge Rd., Paradise, Calif. 95969

[21] Appl. No.: 09/198,321

[22] Filed: Nov. 23, 1998

Related U.S. Application Data

[60] Provisional application No. 60/104,081, Oct. 13, 1998.
[51] Int. Cl.[7] .............................. F16G 11/00; F16B 45/00
[52] U.S. Cl. ..................... 24/129 R; 24/130; 24/131 C; 24/265 H; 24/598.5
[58] Field of Search .................................. 24/129 R, 130, 24/131 C, 300, 265 H, 598.5, 18

[56] References Cited

U.S. PATENT DOCUMENTS

| | | | |
|---|---|---|---|
| 269,399 | 12/1882 | Ensign | 24/130 |
| 1,608,662 | 11/1926 | Nourse | 24/130 |
| 2,151,609 | 3/1939 | Menderman | 24/129 R |
| 2,296,082 | 9/1942 | Bierk | 24/130 |
| 4,928,634 | 5/1990 | Voigt | 24/129 R |
| 4,930,193 | 6/1990 | Baker | 24/129 R |
| 5,339,498 | 8/1994 | Parsons | 24/129 R |
| 5,630,257 | 5/1997 | Brody et al. | 24/130 |
| 5,682,652 | 11/1997 | Brody et al. | |

FOREIGN PATENT DOCUMENTS

| | | | |
|---|---|---|---|
| 0050486 | 9/1910 | Switzerland | 24/130 |

*Primary Examiner*—Victor N. Sakran

[57] ABSTRACT

One preferred embodiment includes an elongate tubular body having a passage for insertion of a rope therethrough along the lengthwise axis of the body. A V-shaped or tapered notch is defined through a walling structure of the body with a wider open mouth portion of the notch open through a first end of the body, the notch extends in a narrowing fashion toward a second end of the body. Secured to the exterior of the walling of the body near the second end is a rope holding structure, the rope holding structure sized for receiving and holding a portion of the rope. A preferred embodiment the rope holding structure is a slotted tube or hook. The rope holding structure is positioned relative to the V-shaped notch to hold a rope in a curved shape between the mouth of the V-shaped notch and the rope holding structure wherein with pulling on the rope in a direction to draw the rope through the passage from the body first end toward the second end, the curved portion of the rope is drawn tightly into the V-shaped notch where it is tightly pinched to secure the rope stationary relative to the rope fitting. One embodiment uses solid material such as plastics or metal to define the tubular body; another embodiment uses stiff resilient coiled wire to define the tubular body, and yet another embodiment uses an elongate plate body instead of a tubular body.

20 Claims, 22 Drawing Sheets

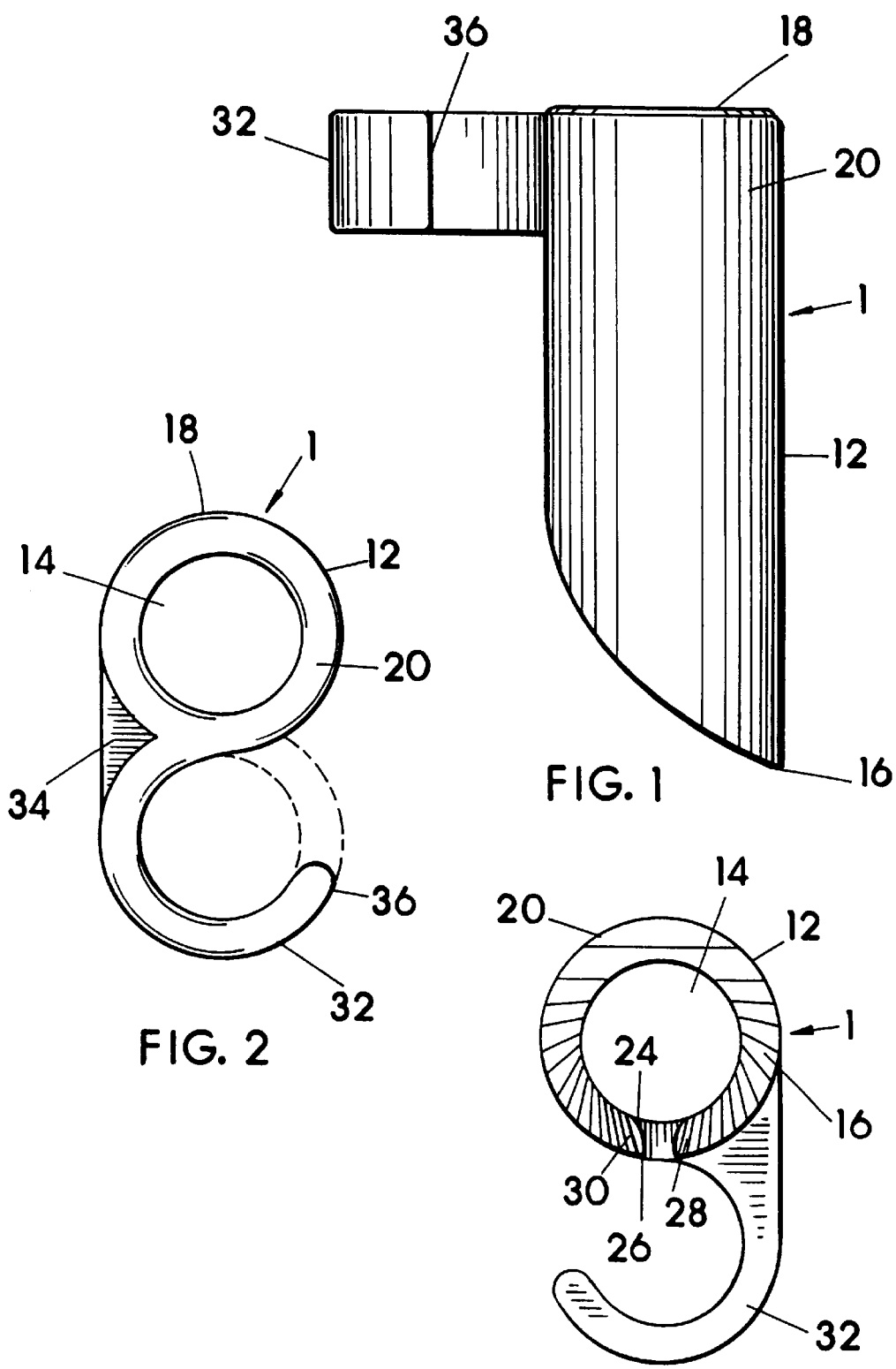

FITTING FOR ATTACHMENT TO A ROPE

A priority claim to the earlier date for common matter is hereby made to my Co-pending Provisional Patent Application titled FITTING FOR ATTACHMENT TO A ROPE, application No. 60/104,081 filed Oct. 13, 1998.

BACKGROUND OF THE INVENTION

1. Field of the Invention

The present invention relates to fittings which can be readily attached stationary to a rope, and readily relocated along the rope when desired. Such fittings being useful for various purposes including for use in anchoring a rope to a relatively stationary item.

2. Brief Description of the Related Prior Art

The most relevant prior art to the present invention, of which I am aware, is shown and described in U.S. Pat. No. 5,682,652 issued Nov. 4, 1997 to S. D. Brody and R. W. Selby for ADJUSTABLE TIE-DOWN STRETCH CORD. While the Brody et al rope fitting used with the stretch cord includes similarities to the present invention, the Brody et al rope fitting, among other differences, does not become generally more secure in its attachment to a rope with increasing load applied to the rope. With the Brody et al tubular body with V-shaped pinch groove used to pinch a rope and secure the tubular body to the rope, tension applied to the rope in a typical loading fashion can and occasionally does cause the rope to slip from the pinch groove resulting in the tubular body (fitting) no longer being secured stationary to the rope. The Brody et al rope fitting as shown and described is structured for allowing a free end of a rope to be passed through a central opening of the tubular body and to then have a portion of the rope grasped by hand and pulled firmly upward and rearward into the V-shaped pinch groove, the pulling of the rope into the pinch groove intended to pinch, i.e., frictionally bind the rope therein to secure the fitting stationary to the rope. However, with this prior art embodiment, the free end of the rope must always be grasped by hand and pulled very firmly upward and rearward into the V-shaped pinch groove to secure the rope, such pulling being difficult for some people due to the high strength requirement, and if not pulled upon with enough force, the rope will not be sufficiently pinched, i.e., frictionally bound in the pinch groove, and will slip from the V-shaped pinch groove with applied load to the rope, and thus the rope will slide through the fitting. Additionally, it should be noted that the load applied to the rope during use of the Brody et al fitting is typically generally in a direction which attempts to pull the free end of the rope back through the tubular body, a pulling direction and force which attempts to and can pull the rope from the V-shaped pinch groove, and this is due primarily to insufficient curvature in the rope at the fitting, the only slight curvature in the rope at the pinch groove being basically only defined by the pinch groove. Thus, with the Brody et al rope fitting, the typical and expected load applied to the rope during use is one which is constantly applying a force to cause the fitting to slip on the rope, with this problem in the Brody et al fitting being a significant problem. Another problem with insufficient curvature in the rope and total reliance on the pinch groove for holding the rope in the Brody et al fitting is that the fitting functions best with rubber or elastic type "soft" rope, and does not function well with other types of ropes such as common multi-strand or braided rope such as that made of nylon, other plastics, natural fibers or the like, or metal cable.

SUMMARY OF THE INVENTION

The present invention teaches structuring providing significant improvement in fittings which can be readily attached stationary to a rope, and readily relocated along the rope when desired. The present invention is a fitting for attachment to a rope, being readily attached stationary to a rope, and readily relocated along the rope when desired. A fitting in accordance with the invention is applied to a rope and holds the rope in the area of the fitting in tight or approximate 180 degree curvature, with a portion of the rope curve tightly pinched in a preferably V-shaped pinch notch of the fitting serving as a rope pinching slot means, and an adjacent portion of the rope held in a rope holding structure of the fitting. The portion of the rope held by the rope holding structure, which is a hook in one form and a slotted tube in another, remains captured so as to maintain the tight bend or curve in the rope, keeping the rope from straightening out under its own resiliency, this maintained tight bend or curve in the rope having been discovered by myself to greatly aid in preventing the rope from being pulled through the V-shaped pinch notch by a pulling load applied to the rope. The rope portion in the rope holding structure can be readily manually removed therefrom to allow straightening of the rope and the manual removal of the rope portion from the V-shaped pinch notch, allowing relocating of the fitting on the rope.

The present invention allows for use of a large variety of rope types and sizes with the same fitting.

A fitting embodiment of the present invention is useful for various purposes including but not limited to enlarging an area of the rope such as to render the rope incapable of being pulled through an eyelet of a tarp or the like opening; for preventing or aiding to prevent a multi-strand rope from unraveling; or when used in conjunction with auxiliary anchoring structures to be herein detailed, for use in anchoring a rope to a relatively stationary item, a handle or to another rope. Various auxiliary anchoring structures are disclosed for use in conjunction with the present fitting.

These, as well as other objects and advantages will become increasing appreciated with continued reading and with a review to the attached drawings.

BRIEF DESCRIPTION OF THE DRAWINGS

FIG. 1 is a side view of a primary embodiment or fitting embodiment in accordance with the present invention;

FIG. 2 is a second end view thereof;

FIG. 3 is a first end view thereof;

DESCRIPTION OF THE PREFERRED EMBODIMENTS

The present invention is a fitting or an improved fitting for attachment to a rope, being readily attached stationary to a rope, and readily relocated along the rope when desired. The term "rope" as herein used applies to rubber rope, elastic rope, fabric covered elastic or rubber rope, cable such as metal cable, common multi-strand rope such as that made of nylon, other plastics, natural fibers or the like, and other elongate flexible structures typically referred to as rope, cord, line or the like having a generally circular cross section.

Figure 4:
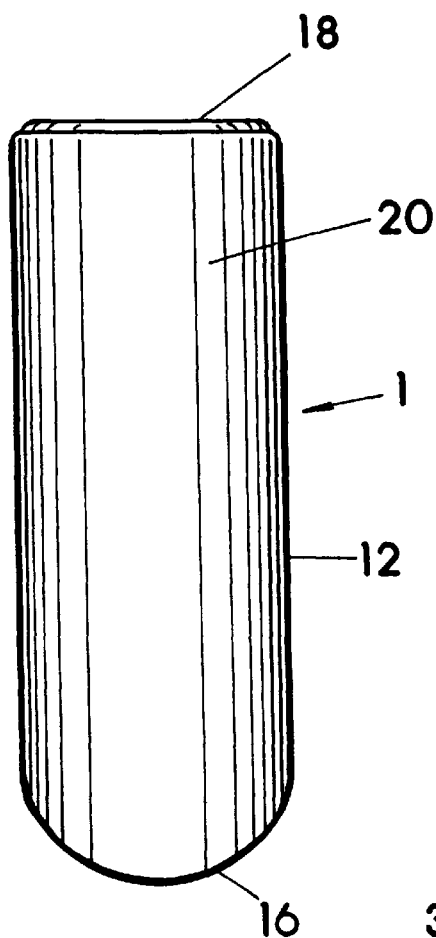
FIG. 4 is a bottom plan view thereof.
Figure 5:
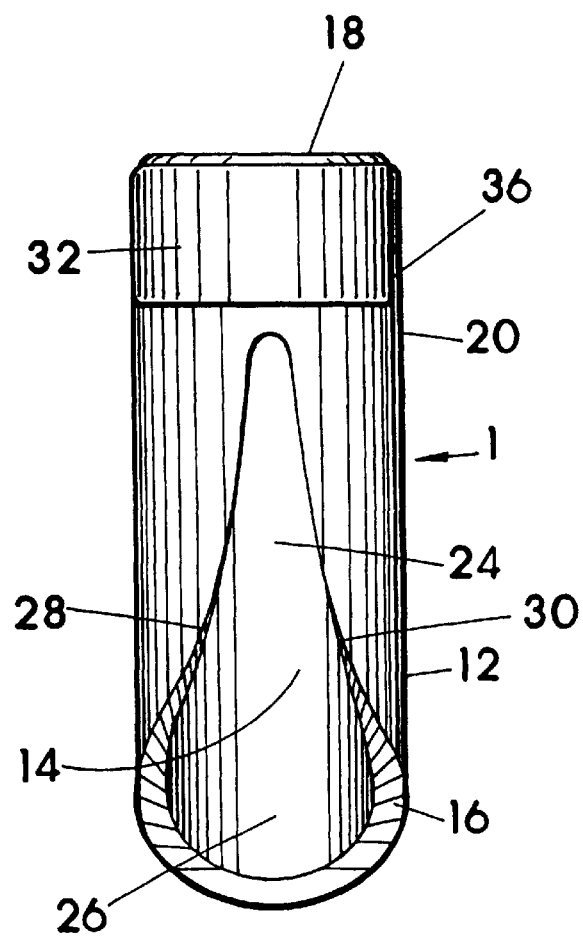
FIG. 5 is a top plan view thereof.
Figure 6:
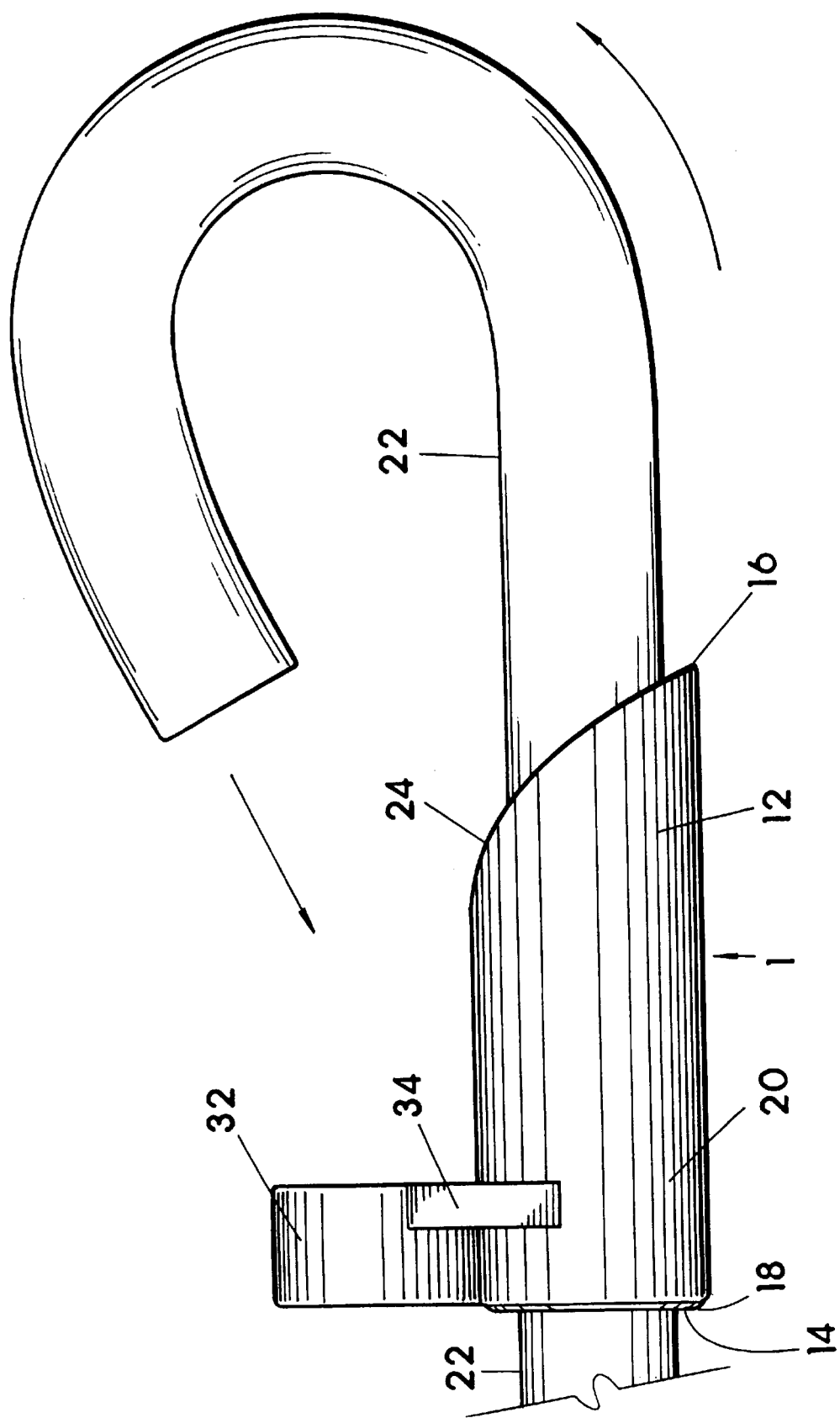
FIG. 6 is a side view, the opposite side shown in FIG. 1, of the primary fitting embodiment in accordance with the present invention and showing a rope having been inserted through the tubular body and in the process of being curved and inserted into the rope holding structure.
Figure 28:
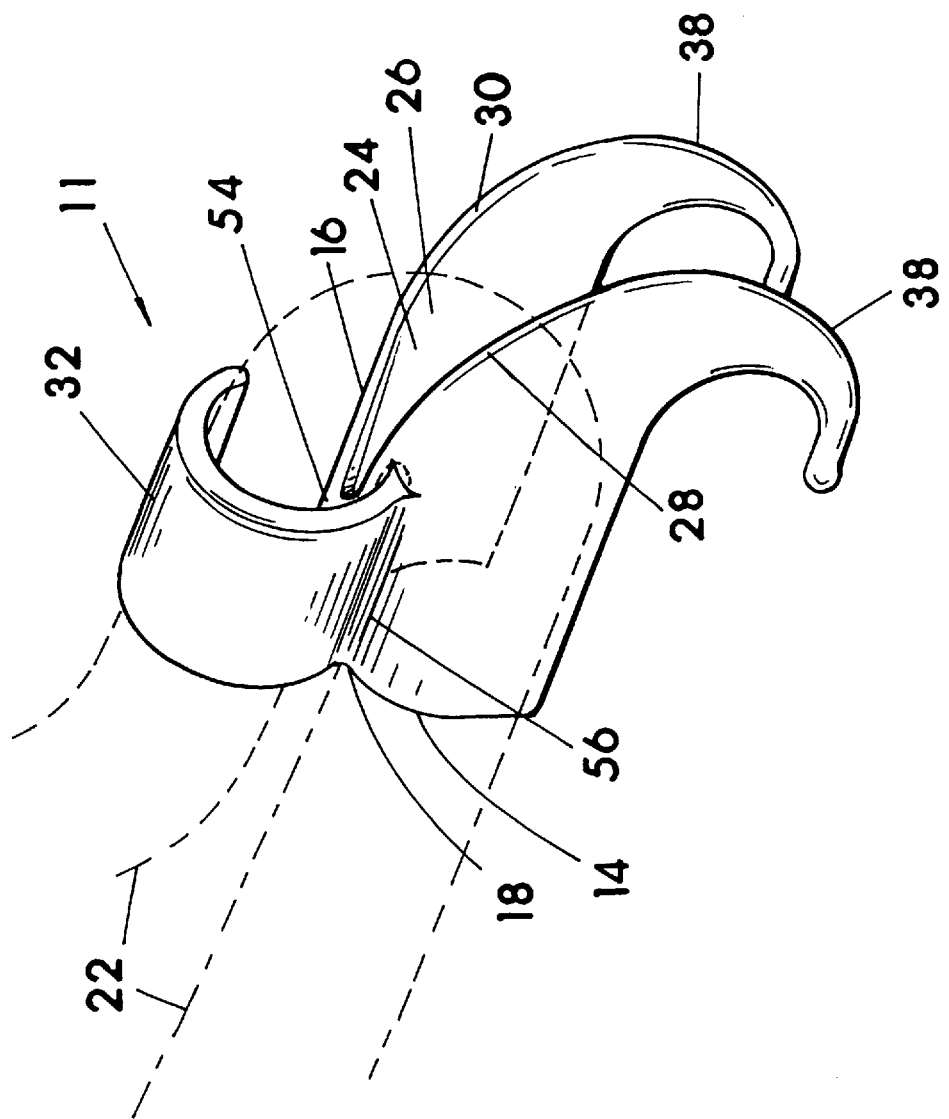
FIG. 28 shows another embodiment in accordance with the invention and having an open bottom or side allowing the fitting embodiment to be placed on a rope any place along the length of the rope without having to thread a free end of the rope through a tubular body.

With reference generally to the drawing figures and now specifically to drawing FIGS. 1–9 and 28. One fitting embodiment exemplifying primary principles of the invention while not the most preferred embodiment in accordance with the invention but functional, comprises an elongate plate or top plate 54 (see FIG. 28), the top plate 54 having a first end 16 and oppositely disposed second end 18 at the end of plate lengthwise axis; a top surface 56 (see FIG. 28) and an oppositely disposed bottom surface through which a rope pinch notch 24 passes between the top and bottom surfaces, the rope pinch notch 24 preferably being a V-shaped notch tapering in width from a mouth 26 thereof at the top plate first end 16 as it extends toward the second end 18 of the top plate 54. Notch 24 serves as a rope pinching slot means and does not necessary have to taper precisely as shown in FIGS. 5 and 28. Connected to the top plate 54 and positioned to reside above or outward of the top surface of the top plate 54 is a rope holding structure 32 (rope holding means) sized and positioned for holding a portion of a rope 22 therein, the rope passing through the V-shaped notch 24 in a curved form, curved between the V-shaped notch 24 and the rope holding structure 32, the tight curve in the rope 22 adding greatly to frictional binding force of the V-shaped notch 24 on the rope when the rope 22 is tightly located in the notch 24. For ease of use, the V-shaped notch 24 should have a mouth 26 open through the first end 16 of the top plate allowing the lateral movement or folding of the rope thereinto, as opposed to the mouth being a hole through which a free end of the rope must be threaded.

In a more preferred embodiment in accordance with the invention, the elongate top plate 54 is arcuate in cross section and includes connected arcuate side walls along its length and two opposite side edges, the side walls aiding in maintaining a portion of a rope centered beneath the bottom surface of the top plate 54. An arcuate bottom wall or plate is preferably connected to the lower or far side wall edges and spanning thereacross, thereby a tube or tubular body 12 (see FIGS. 1–9) basically defined by an annular wall 20 preferably circular in cross-section is defined by the combining of the top plate, side walls and bottom plate. Tubular body 12 of embodiment 1 of FIGS. 1–9 could be other cross sectional shapes such as oval or rectangular or the like in cross section. The bottom wall or plate, like the side walls, aids in maintaining the portion of the rope 22 centered beneath the bottom surface of the top plate and generally parallel thereto for a distance, until the rope turns (bends) and passes through the top plate through or in front of the V-shaped notch 26.

The elongate tubular body 12 of embodiment 1 of FIGS. 1–9 has a lengthwise axis; a central passage 14 along the lengthwise axis; a first end 16 of the body and first end passage-opening at the first end 16; a second end 18 of the body and second end passage-opening at the second end 18 and oppositely disposed from the first end 16 and first end opening. The end openings are openings of the passage 14 through the body 12 and allow a rope 22 to be passed through the body beneath the bottom surface of the top plate of the tubular body. Passage 14 defined by annular wall 20 can be of a single diameter, tapering diameter or stepped diameter within the scope of the invention, and can be of a smaller diameter at the second end 18 and larger diameter at the first end 16 allowing a knot or the like enlargement on the terminal end of a rope 22 passed through passage 14 to be unable to be pulled back completely through the body 12 but allowing the knot to be pulled into the larger passage opening at first end 16 to in effect secure the tubular body 12 from sliding any further and off of the rope. The tubular aspect of body 12 can serve to maintain the fitting on a rope when the fitting is not secured stationary to the rope by the V-shaped notch 24 and rope holding structure 32. The tubular body 12 of embodiment 1 is defined by walling or plates of rigid or semi-rigid material such as of plastics or metal molded, cast or otherwise suitably formed, and in another embodiment labeled embodiment 9 in FIGS. 25 and 26 the tubular body 12 is formed of stiff resilient coiled metal wire (wire formed) helically formed, and defines the elongate tubular body 12 with passage through which a rope can be inserted to lay therein generally parallel to the lengthwise axis of the body 12 at least for a distance.

Figure 25:
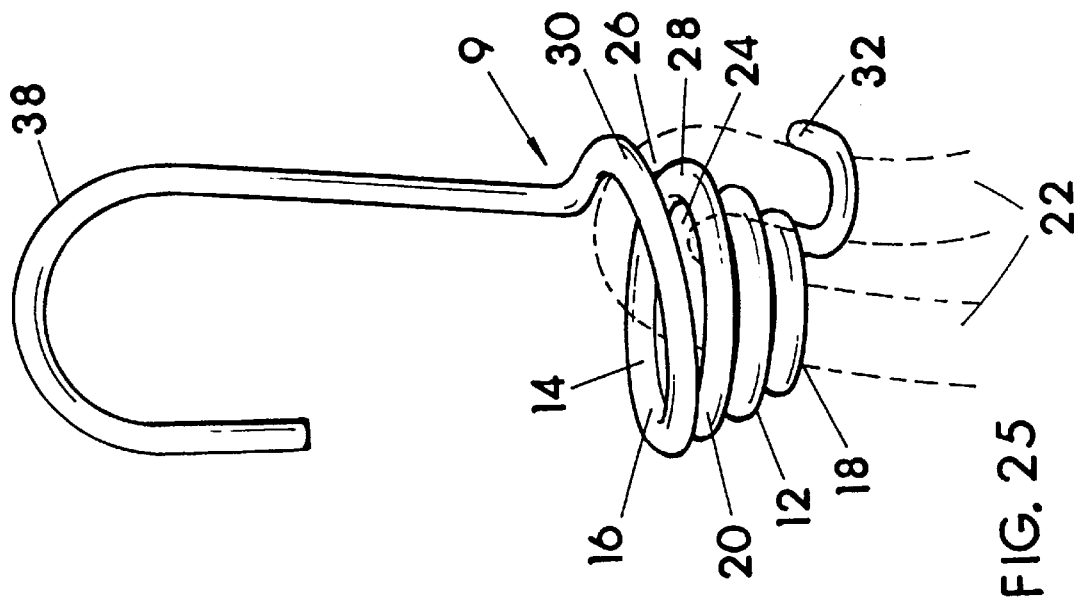
FIG. 25 is a wire formed embodiment of the present invention showing a rope in broken lines passing through the central passage, residing in a V-shaped pinch notch in the tubular body and captured under the rope holding structure of the embodiment. A large anchoring hook is also shown.

The generally V-shaped notch 24 is defined through a portion of the body annular wall 20 with the wider open mouth 26 portion of the notch 24 open through the first end 16 of the body 12 and passage 14, the notch 24 being V-shaped extends in a narrowing or tapering fashion toward the second end 18 of the body 12 and preferably terminates prior to reaching the second end of the body so as to be closed-ended and narrower than the mouth 26 of the notch 24. Wall edges 28 and 30 define the lateral boundaries of notch 24 and could be rigid or flexible to a degree. In the wire formed embodiment 9, the V-shaped notch 24 is defined as a narrowing space between two helically formed wire coils and extends at an angle toward the second end of the body. The passage 14 through the body 12 is large enough to allow sliding of a properly sized rope therethrough, and ropes of numerous sizes can be utilized with the same preferred fitting embodiment because of the V-shaped notch 24 being such that the rope 22 will be pulled into a proper pinched point of the notch 24 to be frictionally bound therein. The V-shaped notch 24 defines a notch leading from exterior of the tubular body 12 through the annular wall 20 defining the tubular body 12 and into the central passage 14, allowing a portion of the rope 22 to exit the tubular body through the notch 24 and at an angle, somewhat perpendicular, relative to the lengthwise axis of the body 12 as seen in FIGS. 8 and 25 for example. Secured to the exterior of the annular wall 20 (body 12) preferably near the second end 18 is the rope holding structure 32, one preferred version thereof being a hook terminating at a terminal edge 36 thereof in spaced relationship to the body 12 (see FIGS. 1–16, the space in effect defining a slot wide enough through which to pass a rope 22 laterally for positioning the rope in the hook structure and captured against moving back out of the hook absent manual manipulation, i.e., manual removal therefrom. Rope holding structure 32 is preferably positioned in general alignment along the body lengthwise axis with the V-shaped notch 24 and rearward of the mouth 26 of the notch (more toward the second end of the body) and holds or aids to hold a rope in a tight curve between the mouth 26 of the V-shaped notch 24 and the rope holding structure 32 (see FIGS. 6–9), a position of the rope 22 that with pulling on the rope 22 in a direction to draw the rope 22 through the passage 14 from the first end 16 toward the second end 18 of the body 12, such as with normal and expected loading applied to the rope in most uses, the tight curved portion of the rope is drawn further into the V-shaped notch 24 where it is tightly pinched to secure the rope 22 stationary relative to the rope fitting in accordance with the invention. The portion of the rope captured by the rope holding structure 32 remains captured, unless intentionally removed, so as to maintain the tight bend or curve in the rope, keeping the rope 22 from straightening out under its own resiliency, this maintained tight bend or curve in the rope preventing or at least greatly reducing the possibility of the rope ever being pulled through the V-shaped pinch notch 24 by pulling load applied to the rope.

The inherent resiliency present in most ropes to a lessor or greater degree is such that when a rope is passed through body 12 and bent back along the lengthwise axis of body 12, the rope will try to spring back in a path straight up and back from the body lengthwise axis and the length of the V-shaped notch 24, and so by placing the rope holding structure 32 along the axis of the length of the V-shaped notch 24 (could be rotated around the body from that shown to a degree and still function suitably), the rope will move upward to in effect hit a ceiling, i.e. such as the top under side of a hook for example, of the rope holding structure 32 and be captured thereby, and if the rope holding structure 32 is a hook structure such as that of FIGS. 1–9, the rope will not on its own spring laterally out of the open side of the hook. If the rope holding structure 32 includes a centered top slot for lateral passage of the rope therethrough as in FIGS. 29 and 30, the slot is defined to be normally narrower than the rope and the rope is either an elastic rope which can be stretched thin and passed through the slot wherein the stretching force is then relieved and the rope expands to a normal diameter wider than the slot an thus remains captured, or alternatively the walls of the rope holding structure 32 adjacent the central slot (see FIGS. 29 and 30) are flexible and resilient and can spread with a rope pressed thereagainst to allow entrance of the rope and then the walls defining the slot spring back toward one another to define a slot width less than the diameter of the now capture rope.

A fitting embodiment in accordance with the present invention is useful for various purposes including but not limited to enlarging an area of the rope such as to render the rope incapable of being pulled through a hole or eyelet of a tarp or the like opening; for preventing or aiding to prevent a multi-strand rope from unraveling; or when used in conjunction with auxiliary anchoring structures to be further herein detailed, for use in anchoring the fitting and a rope to a relatively stationary item, a handle or to another rope or rope end.

Figure 7:
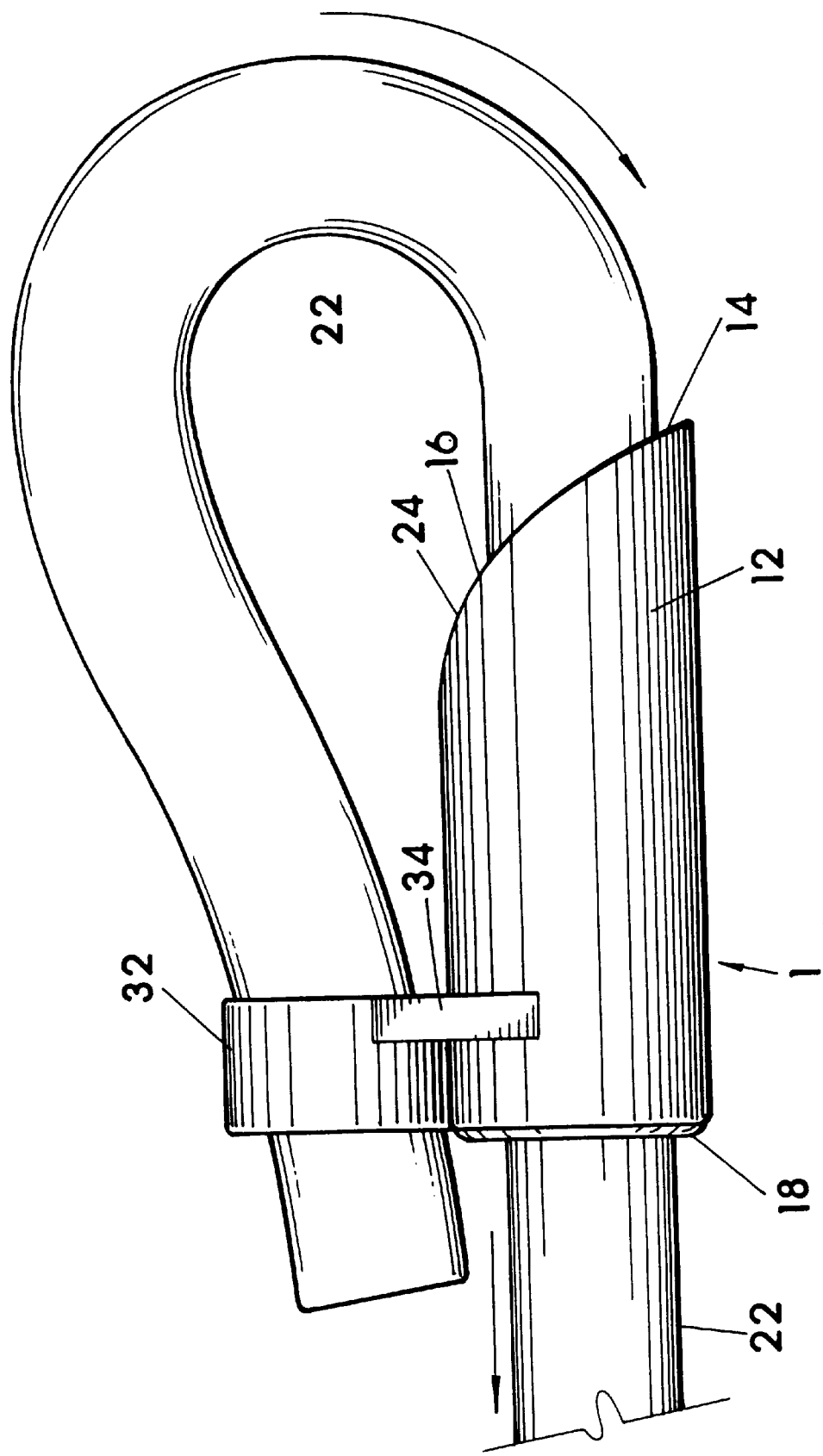
FIG. 7 shows the arrangement of FIG. 6 with the free end portion of the rope having been manually located underneath the aforementioned rope holding structure.
Figure 8:
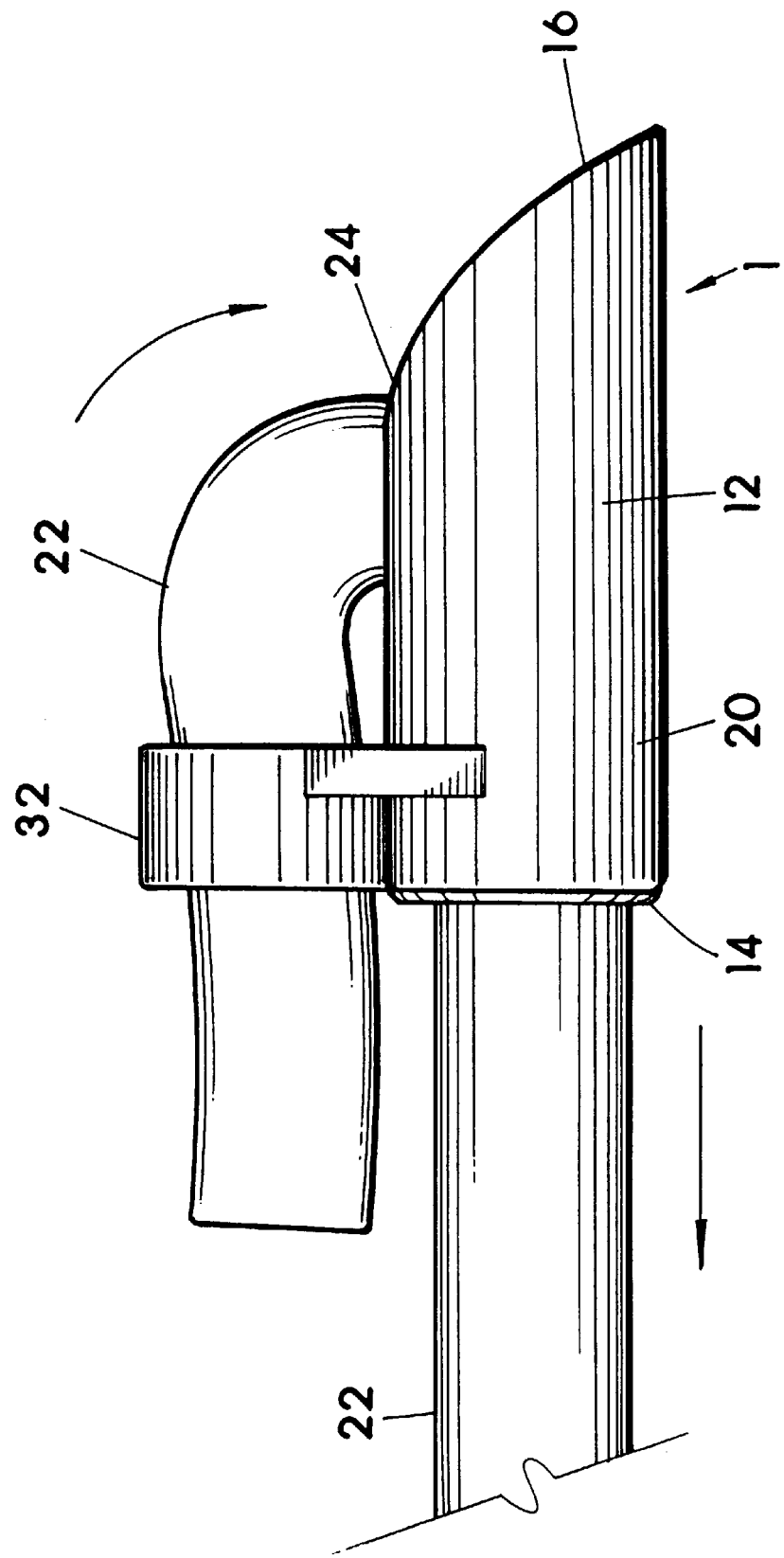
FIG. 8 shows the arrangement of FIG. 7 from a side view, wherein the main rope portion has been pulled back relative to the fitting embodiment and the curvature in the rope has been pulled into the fitting as indicated by direction arrows.
Figure 9:
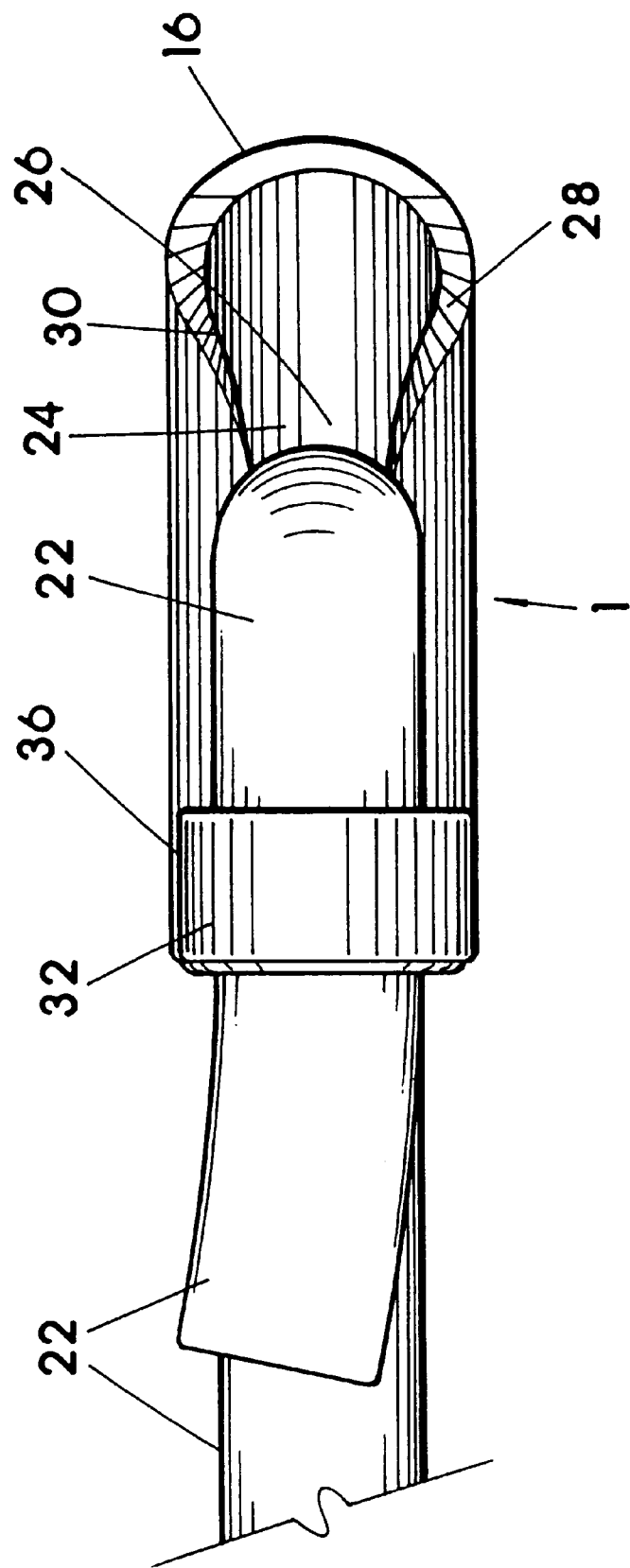
FIG. 9 is a top view of that shown in FIG. 8 showing the rope deeply located in the V-shaped pinch groove and located under the rope holding structure at the second end of the fitting.
Figure 10:
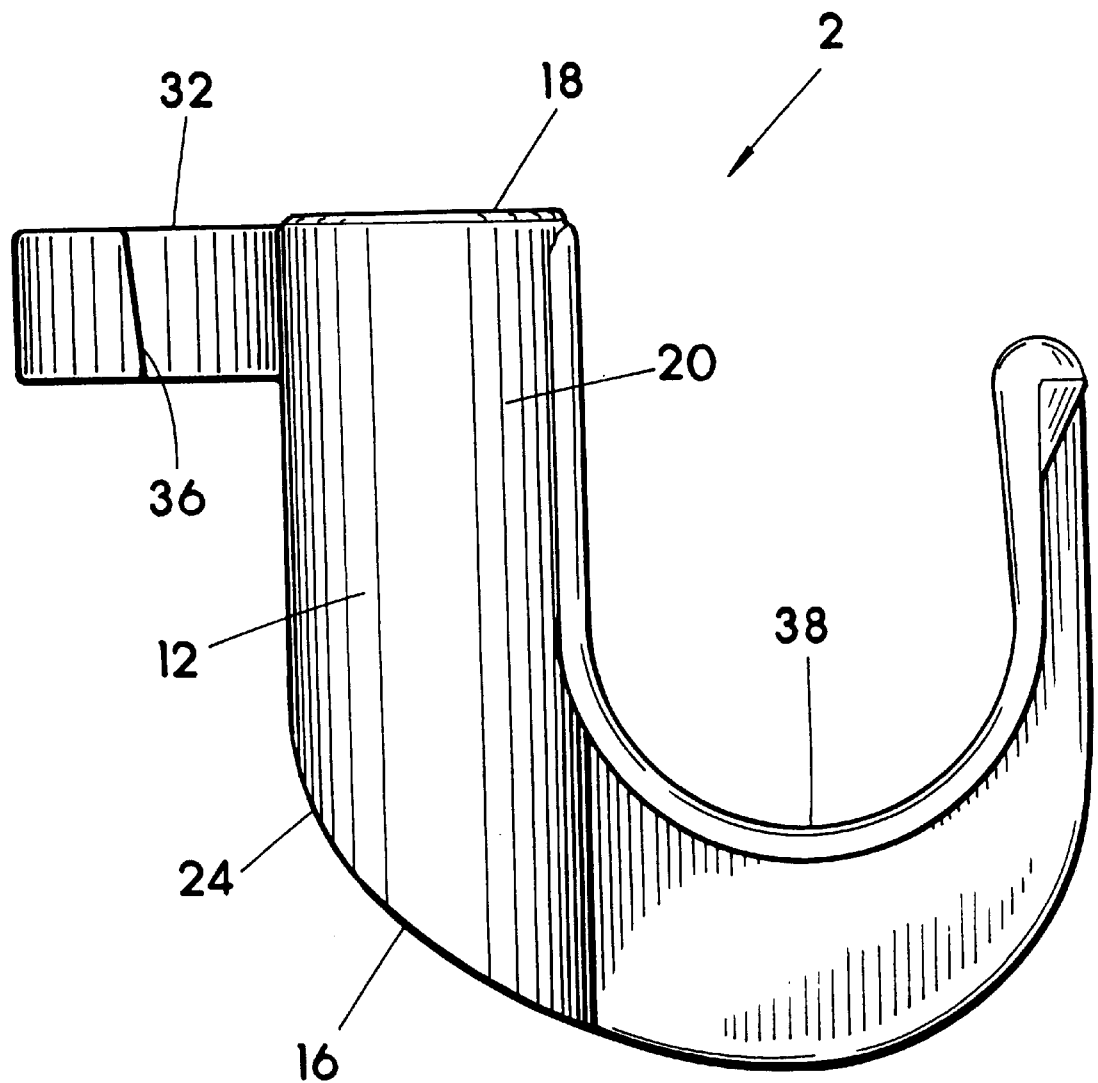
FIG. 10 shows a right side view of an auxiliary anchoring structure secured to the fitting embodiment of FIGS. 1–9, i.e., an anchor hook for hooking over or through an item such as to render the fitting relatively stationary to an item.
Figure 11:
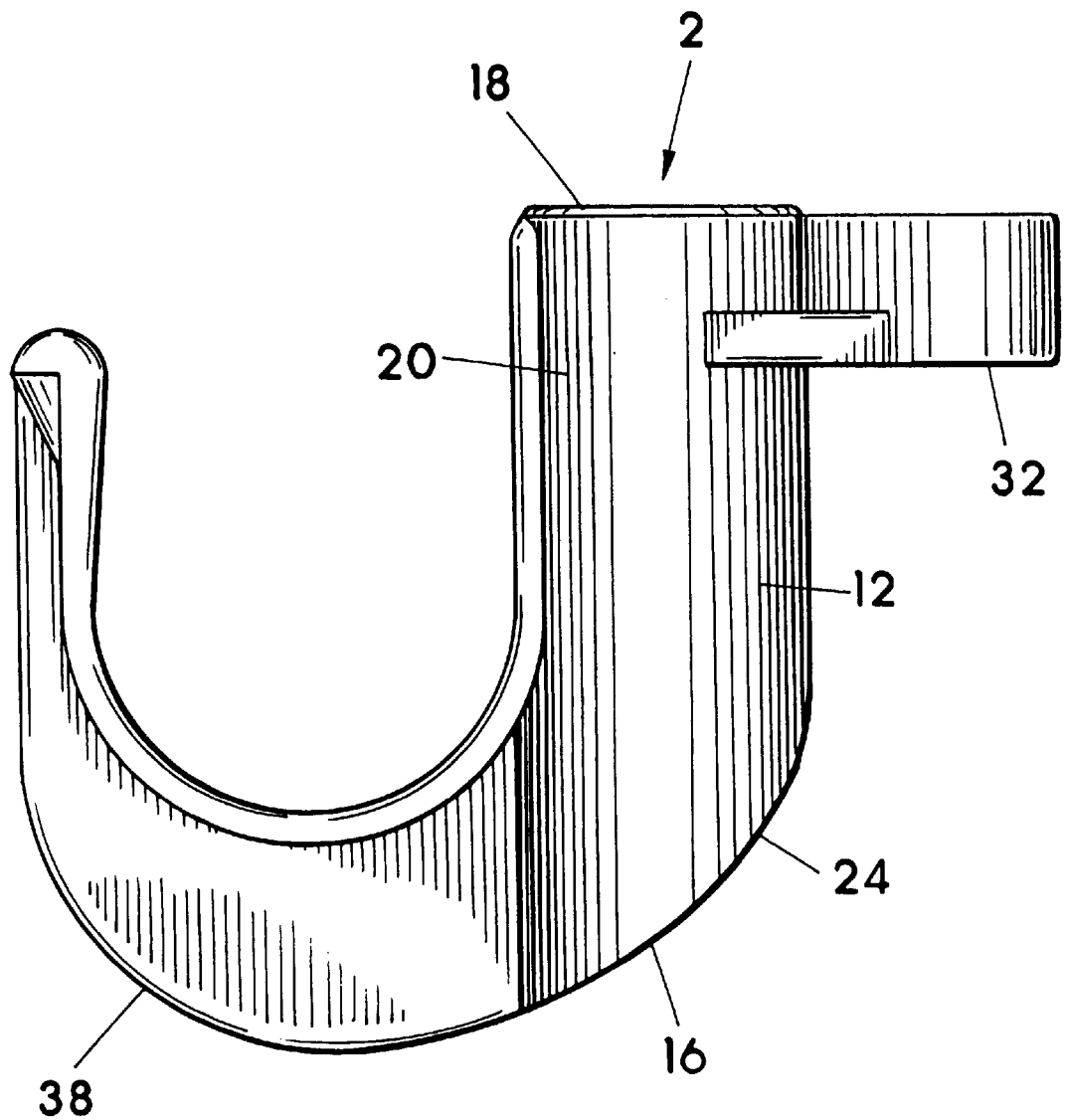
FIG. 11 shows a left side view of the anchor hook bearing fitting embodiment of FIG. 10.
Figure 12:
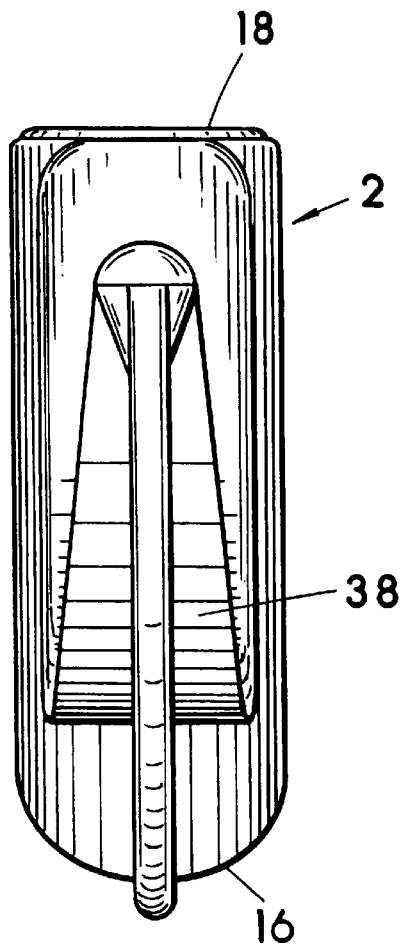
FIG. 12 is a bottom view thereof.
Figure 13:
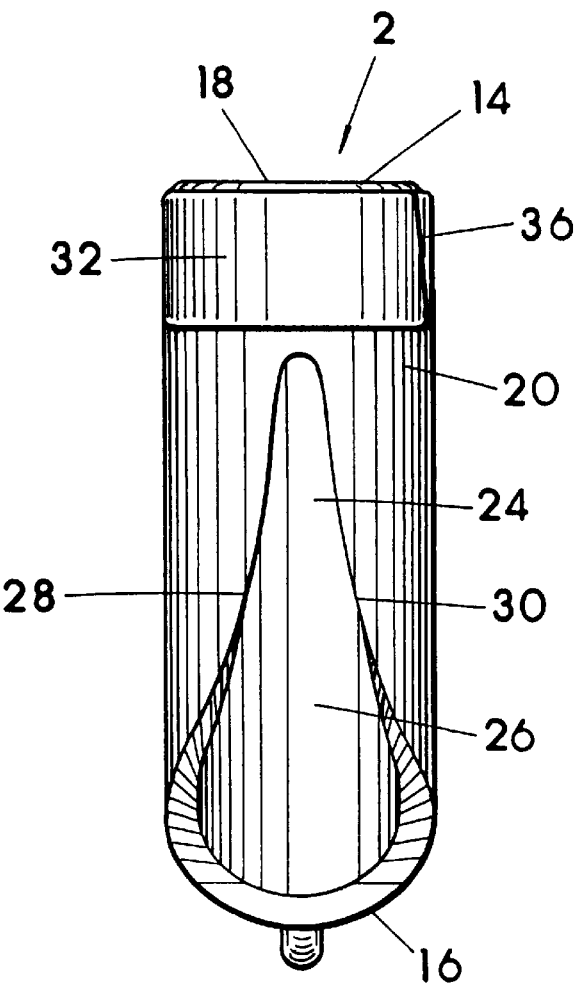
FIG. 13 is a top view thereof.
Figure 14:
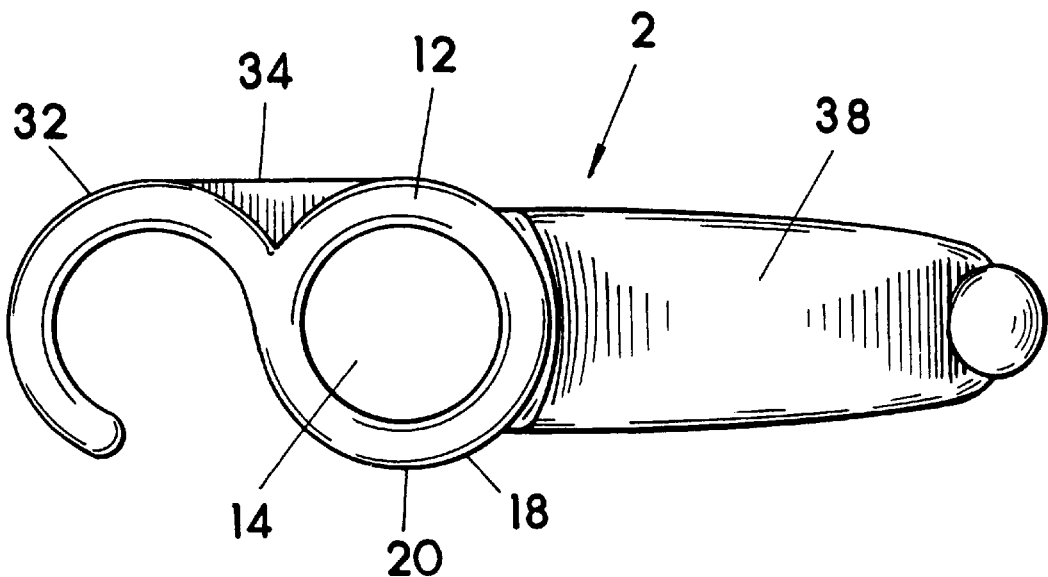
FIG. 14 is a second end view thereof.
Figure 15:
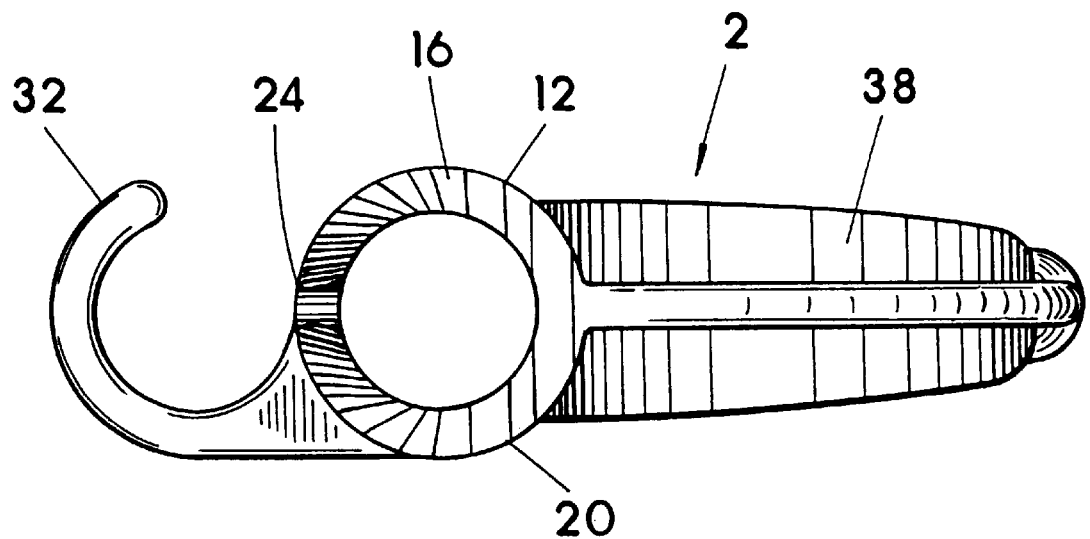
FIG. 15 is a first end view thereof.
Figure 16:
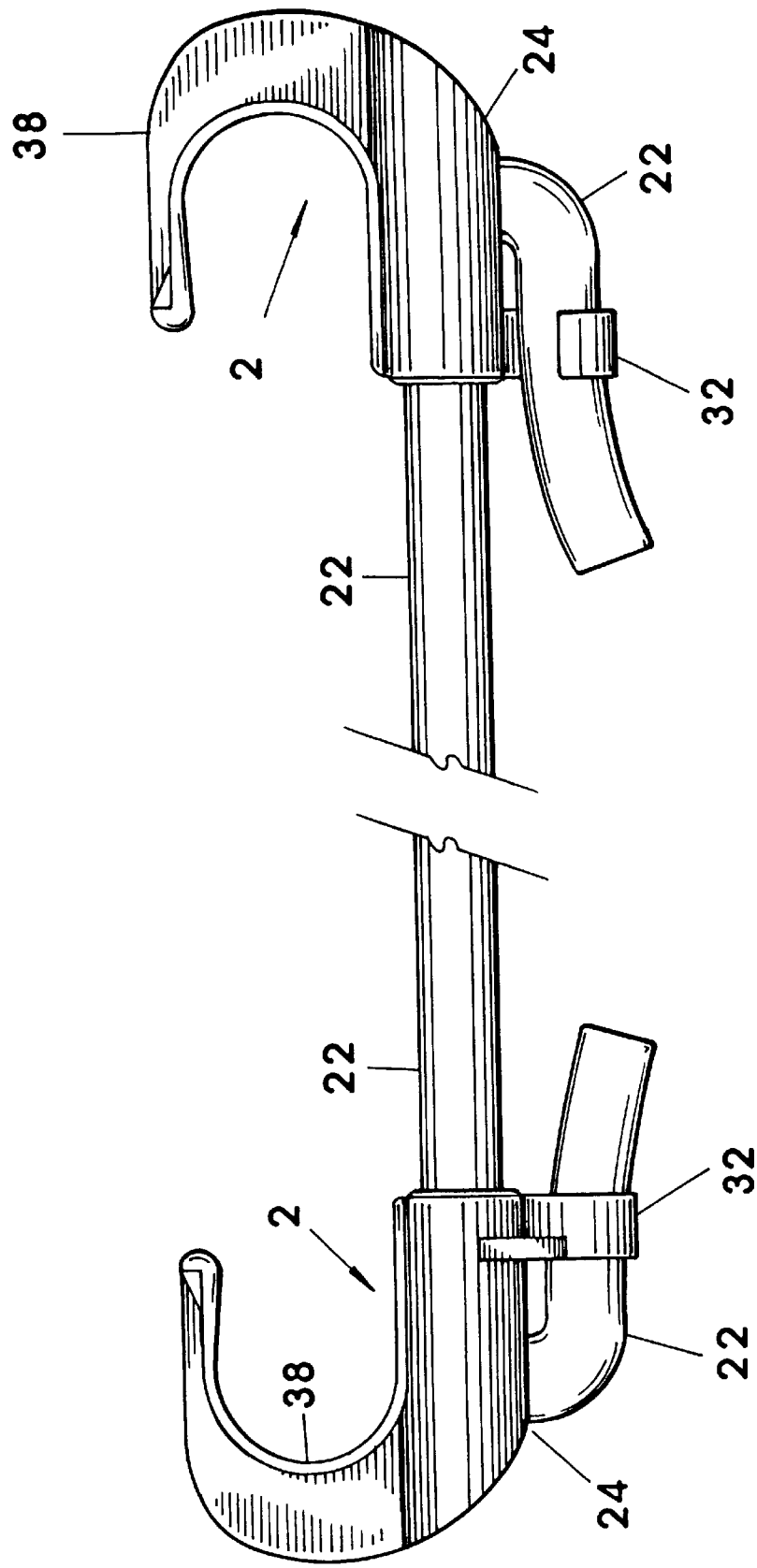
FIG. 16 shows two of the anchor hook bearing embodiments connected to a rope and defining an adjustable length tie-down cord.

The present invention includes the rope holding structure 32 which in effect holds a portion of the rope having been inserted through the tubular body 12 and then bent back to be adjacent the filling and to aim in a general direction of parallel to the balance or rest of the rope extending from second end 18, the rope being bent in a curve in front of the mouth 26 of the V-shaped notch 24 and held in the bent form by the rope holding structure 32 with the held portion of the rope in the holding structure 32 retained near the exterior of the fitting body 12 and aiming back toward the balance of the rope (see FIGS. 6–9), or in other words with the rope 22 folded back basically onto itself with the folding defining a curve in the rope, with the curve either being pulled tightly in the V-shaped notch 24 as shown in FIGS. 8–9 or capable of being pulled into the V notch 24 as shown in FIG. 7 to be frictionally bound therein. The tubular nature of the preferred tubular body 12 helps hold the rope portion within the tube which is in effect beneath the bottom surface of the top plate generally parallel to the portion of the rope 22 held in the rope holding structure 32 which is in effect positioned above the top surface of the top plate, the rope is in effect bent approximately 180 degrees with the bend laying within the V-shaped notch 24 when the fitting is secured stationary to the rope 22 as shown in FIGS. 7–9.

Figure 29:
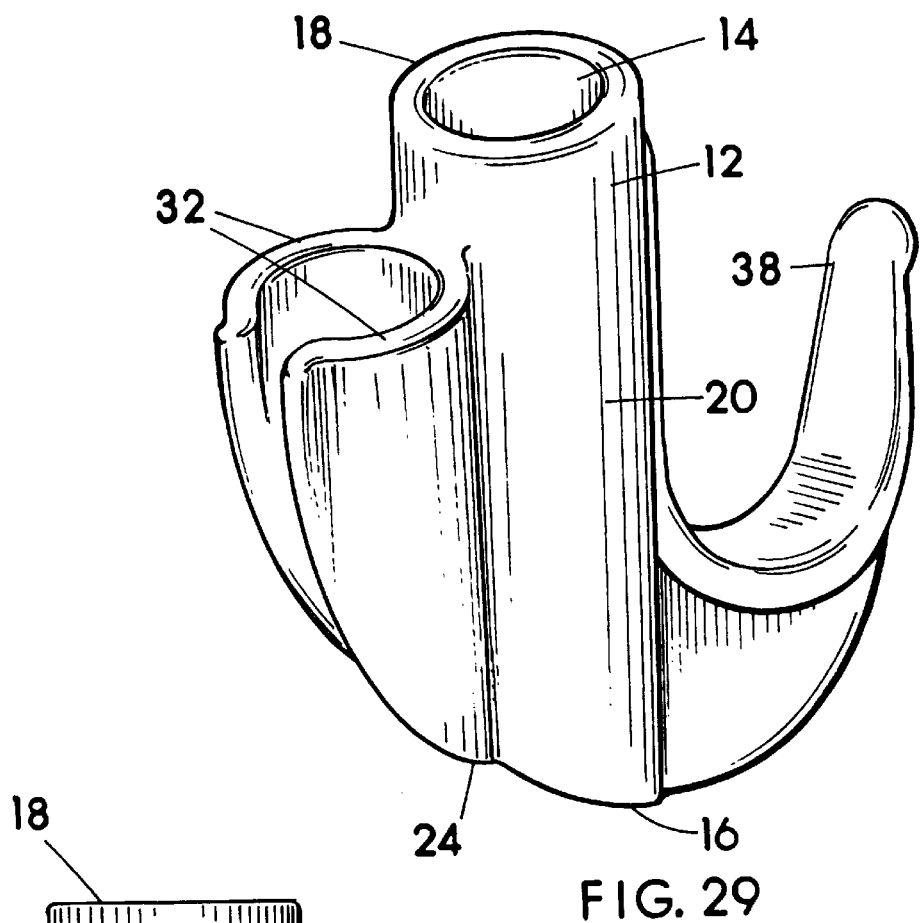
FIG. 29 is a perspective view of another embodiment in accordance with the invention and primarily showing another embodiment of rope holding structure.
Figure 30:
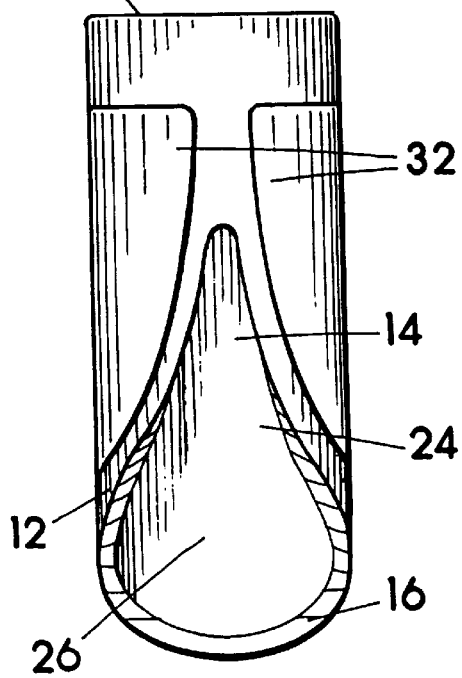
FIG. 30 is a top view of the FIG. 29 embodiment.

Structurally, the rope holding structure 32 can be a short tube with the through-opening (bore) thereof aiming generally toward the mouth 26 of the V-shaped notch 24 through which a free end of a rope can be inserted (see FIG. 2 and note broken lines near 32 indicating the rope holding structure potentially being a closed loop or tube); a pinch clip such as a tightly fitting hook for pinching and frictionally holding the rope to prevent the rope from straightening out; or an open sided hook structure, tightly or loosely fitting about the rope, which allows the rope to be moved laterally into (or out of) the hook structure (rope holding structure 32) without the user having to insert a free end of the rope; or it can be a tube with a slotted opening through which the rope can be passed laterally to lay within the slotted tube, the slotted tube in effect being an open sided hook structure, see FIGS. 29–30. The rope holding structure 32 is secured by integral molding, casting or by bonding on the exterior of the tubular body 12 or top surface of the top plate 54 (FIG. 28) thereof, the rope holding structure 32 holding the bent rope from straightening out, i.e., bending back toward the first end of the body and mouth 26 of the V-notch 26, and thus providing significantly greater ease in securing the fitting stationary to the rope due to the maintained tight curve in the rope, and in a manner wherein the greater the load applied to the rope such as during use, generally the greater the holding connection, i.e., frictional binding, of the present fitting to the rope. A connection strengthening and optional gusset 34 (FIG. 6) is shown on embodiment 1 to add strength to the connection of rope holding structure 32 to body 12.

The present invention also allows for the easy and ready disconnection or relocation of the fitting from or on the rope when desired, wherein the user can easily manually remove the rope 22 portion from the rope holding structure 32, and then straighten the rope out to have the rope out of the V-shaped notch 24 and laying in parallel alignment with the passage 14 through body 12, at which point the fitting can be slidingly moved along the rope, and if desired pulled over a free end of the rope and thus removed, or moved to another location on the rope and then again rendered stationary on the rope by way of locating a portion of the rope 22 in the rope holding structure 32 to define a tight curve in the rope between the mouth 26 of the V-shaped notch 24 and the rope holding structure 32.

In order to pull the rope 22 tightly into the V-shaped notch 24, the rope 22 installed through the body 12 can be pulled angularly away from the first end 16 of the body 12, the body 12 rendered stationary by holding in one's hand or anchoring it with an auxiliary anchoring structure to be detailed, which defines the rope bend and pulls the bend of the rope tightly into the pinch of the V-shaped notch 24, and followed by the user locating the proper portion of the rope in the rope holding structure 32 so that the bend or curve in the rope is maintained, a step rendered most easy when the rope holding structure 32 has a top or side slot or side opening allowing the movement of the rope 22 into the holding structure 32 absent having to thread a free end through a closed loop or tube.

Alternatively, as indicated in FIGS. 6–9, in order to pull the rope 22 tightly into the V-shaped notch 24, the rope 22 can be installed through the tube 12, grasped by hand (hand not shown in the drawings) and bent into a large and loose curve in front of the mouth 26 of the V-shaped notch 24, the proper portion of the rope 22 then located in the rope holding structure 32 so that the curve in the rope is maintained, the tubular body 12 then rendered stationary by holding in one's hand or anchoring it with an auxiliary anchoring structure (such as a anchor hook 38 to be detailed), and followed by pulling the rope in a direction of pulling the rope back through the tubular body 12 from the first end 16 toward the second end 18 to reduce the radius of the curve and to pull the curve in the rope into the mouth 26 of the V-shaped notch 24 as indicated in FIGS. 7 and 8.

Once the present fitting is secured to the rope 22 with the rope tightly pinched in the pinch notch 24 and held in a curve with the aid of the rope holding structure 32 as shown in FIGS. 8 and 9, the rope 22 on either end of the fitting can be allowed to go slack generally without the fitting losing its frictional grip on the rope.

As previously mentioned, various auxiliary anchoring structures are disclosed for use-in conjunction with the present fitting. The various auxiliary anchoring structures when each are in combination with the present fitting constitutes an embodiment in accordance with the present invention.

Embodiment 1 of the present invention above described is shown in drawing FIGS. 1–9 and not including an auxiliary anchoring structure.

Embodiment 2 shown in FIGS. 10–16 is embodiment 1 with an auxiliary anchoring structure connected to the bottom of body 12 such as by integral molding, casting or bonding or the like, the specific auxiliary anchoring structure shown is an anchor hook 38 allowing hooking the hook 38 to a relatively stationary item such as a cargo hook of a pick-up truck bed (for example only) and having a rope 22 secured stationary to the present fitting 2 extending outward from second end 18 of body 12 across the truck bed and under tension (load) via the rope being pull tight and the other end of the rope being secure on the opposite side of the truck bed, such as for securing loads or tarps in a truck.

Figure 17:
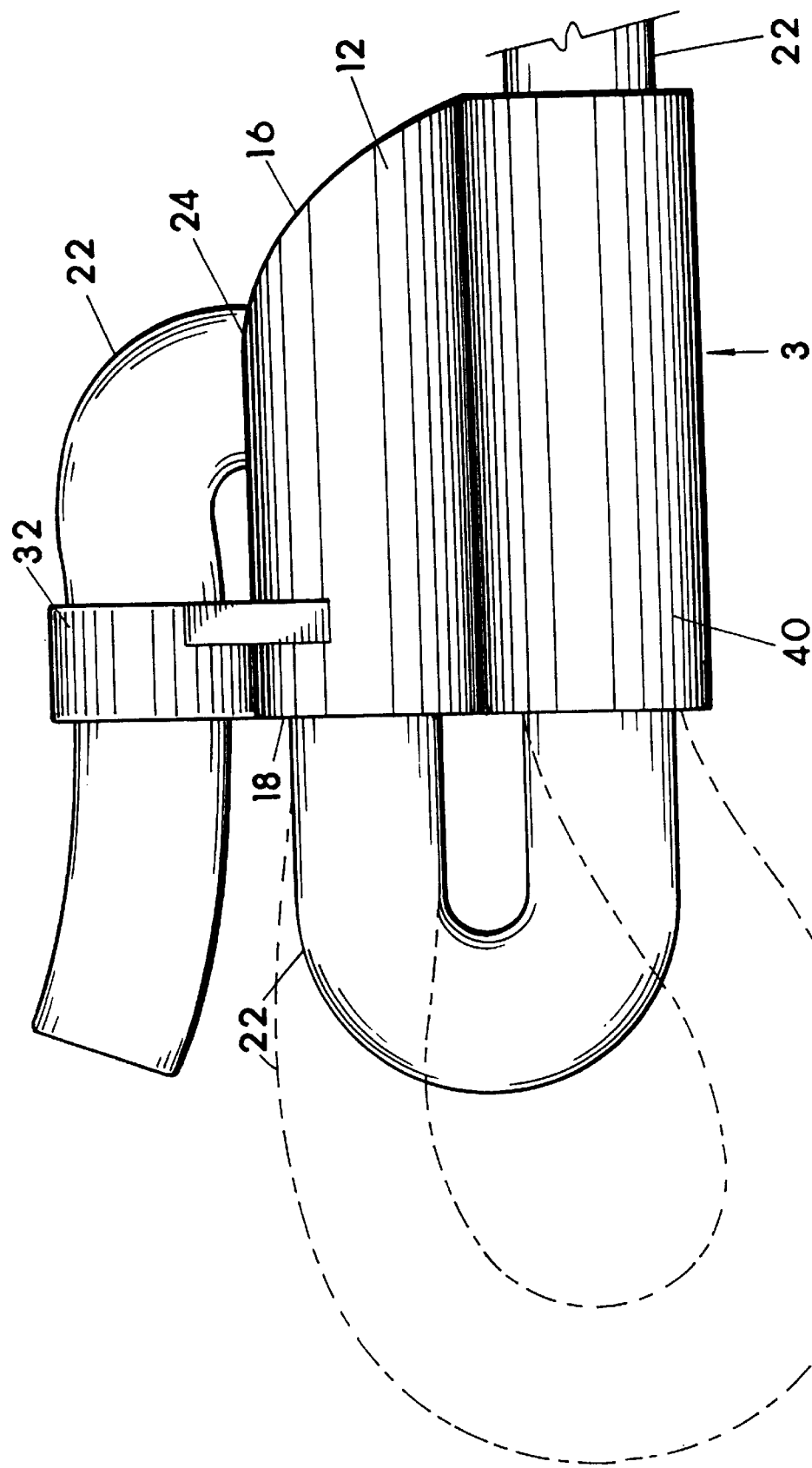
FIG. 17 shows a side view of another embodiment in accordance with the invention and using the fitting embodiment of FIGS. 1–9 with an additional bottom conventional tube defining a slip-noose arrangement in the rope.

Embodiment 3 shown in FIG. 17 is fitting embodiment 1 with a tube 40 secured using any suitable securement to the bottom of body 12, the tube allowing free passage of a rope 22 and for the rope to then pass through body 12 for secure to the fitting in the pinch notch 24 and rope holding structure 32. This embodiment allows for defining an adjustable loop in a rope 22 as indicated in the drawing.

Figure 18:
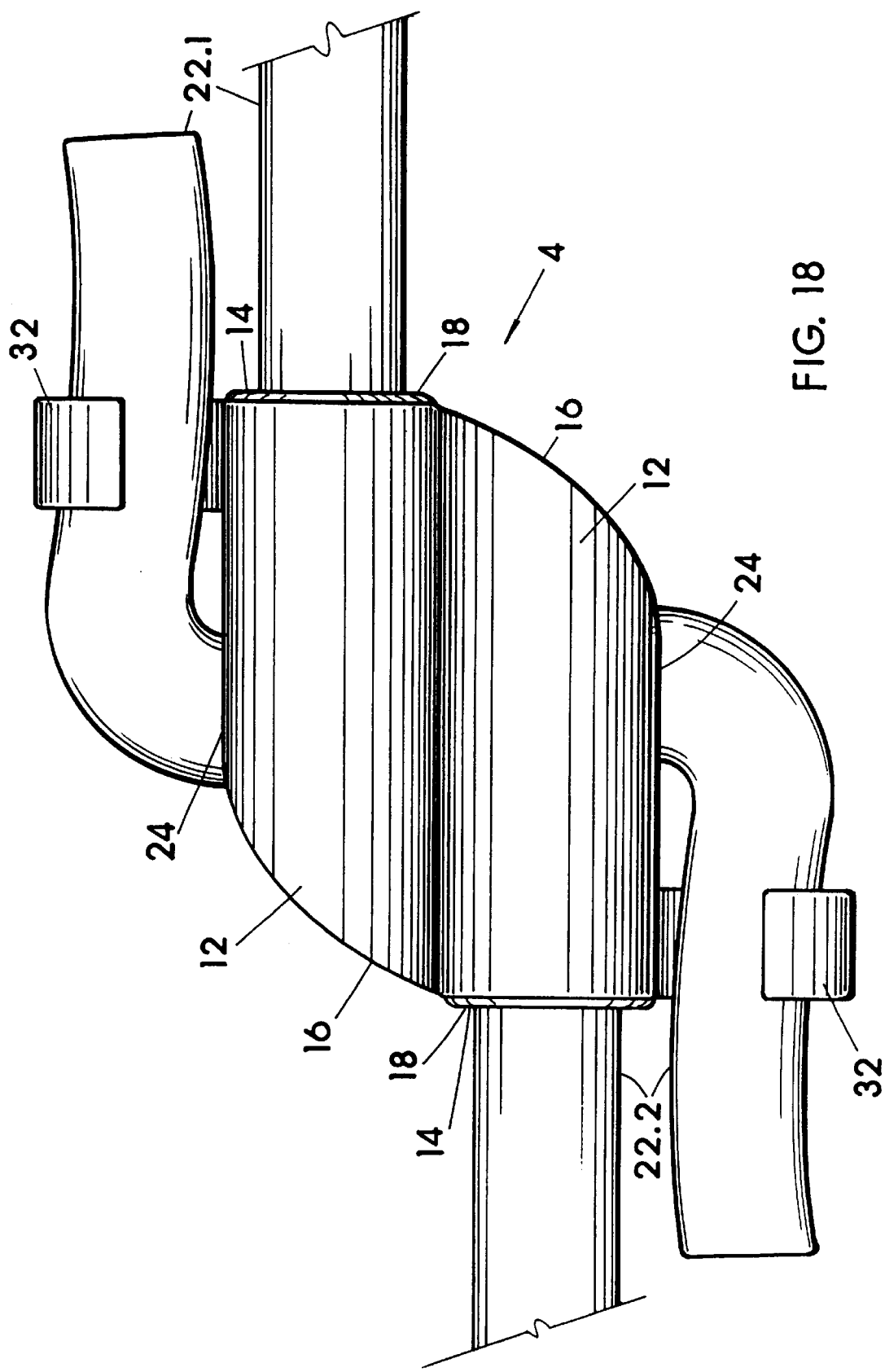
FIG. 18 shows a side view of another embodiment in accordance with the invention and using the fitting embodiment of FIGS. 1–9 and a second like fitting embodiment attached in an end-for-end reversed or flipped relationship for use in connecting two ropes or rope ends together.

Embodiment 4 shown in FIG. 18 is fitting embodiment 1 with a second like fitting embodiment 1 attached thereto using any suitable attachment means in an end-for-end reversed or flipped relationship for use in connecting two ropes or rope ends together. Shown is a first rope or rope end 22.1 and a second rope or rope end 22.2 effectively tied together using the fitting 4. One rope can be secured in a closed loop or two separate ropes can be tied together using the FIG. 18 embodiment 4.

Figure 19:
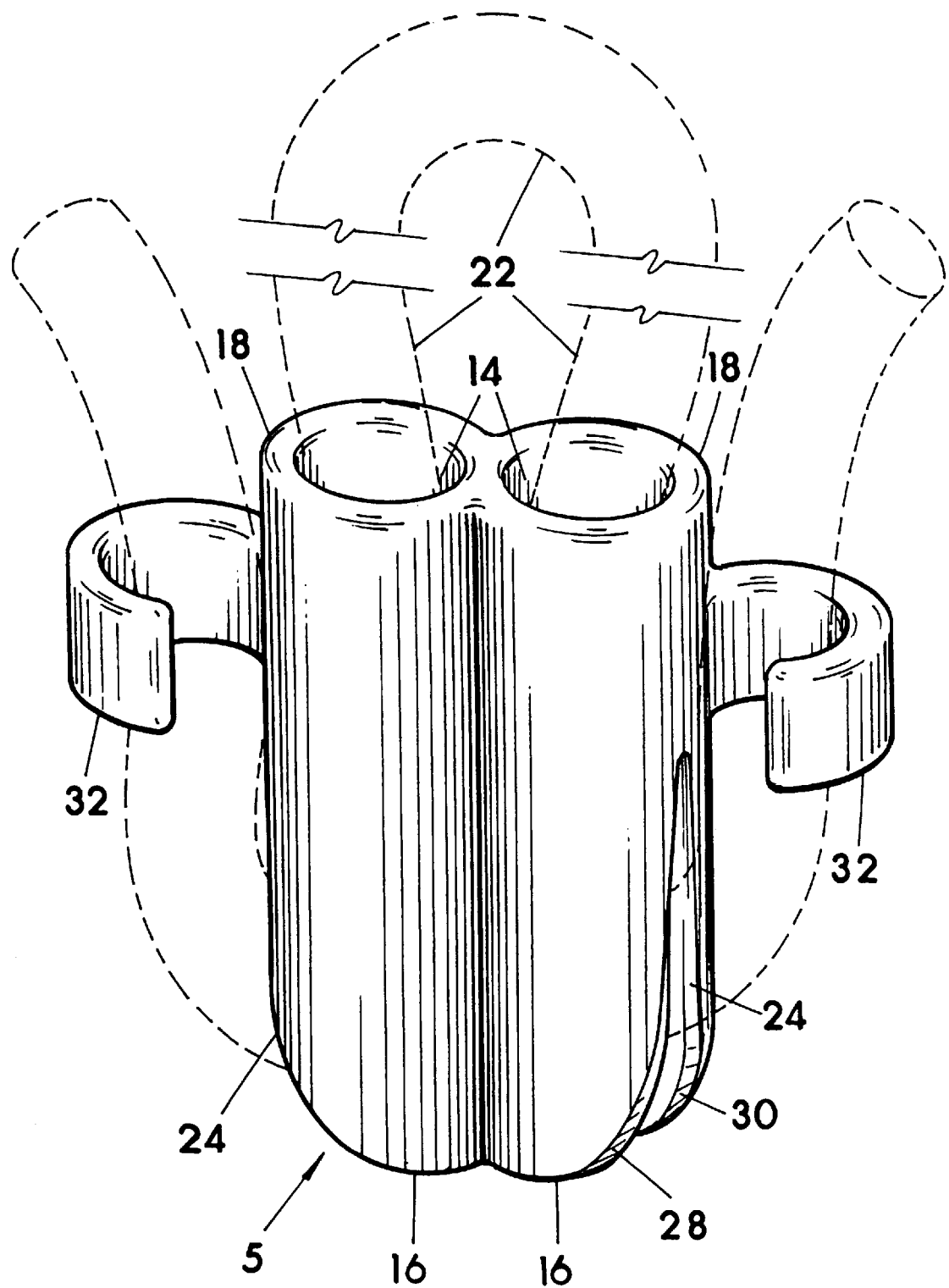
FIG. 19 shows another embodiment in accordance with the invention and using the fitting embodiment FIGS. 1–9 and a second like fitting embodiment attached in an endward aligned or adjacent relationship for use in connecting two ropes or rope ends together.

Embodiment 5 shown in FIG. 19 is fitting embodiment 1 with a second like fitting embodiment 1 attached thereto using any suitable attachment means but not in an end-for-end reversed or flipped relationship as in FIG. 18, but with the first ends 16 of the two bodies 12 adjacent one another, and the second ends 18 adjacent one another as shown. Embodiment 5 can be used in connecting two ropes or rope ends together, or for defining a lockable diameter loop in a rope 22 such as for bundling items.

Figure 20:
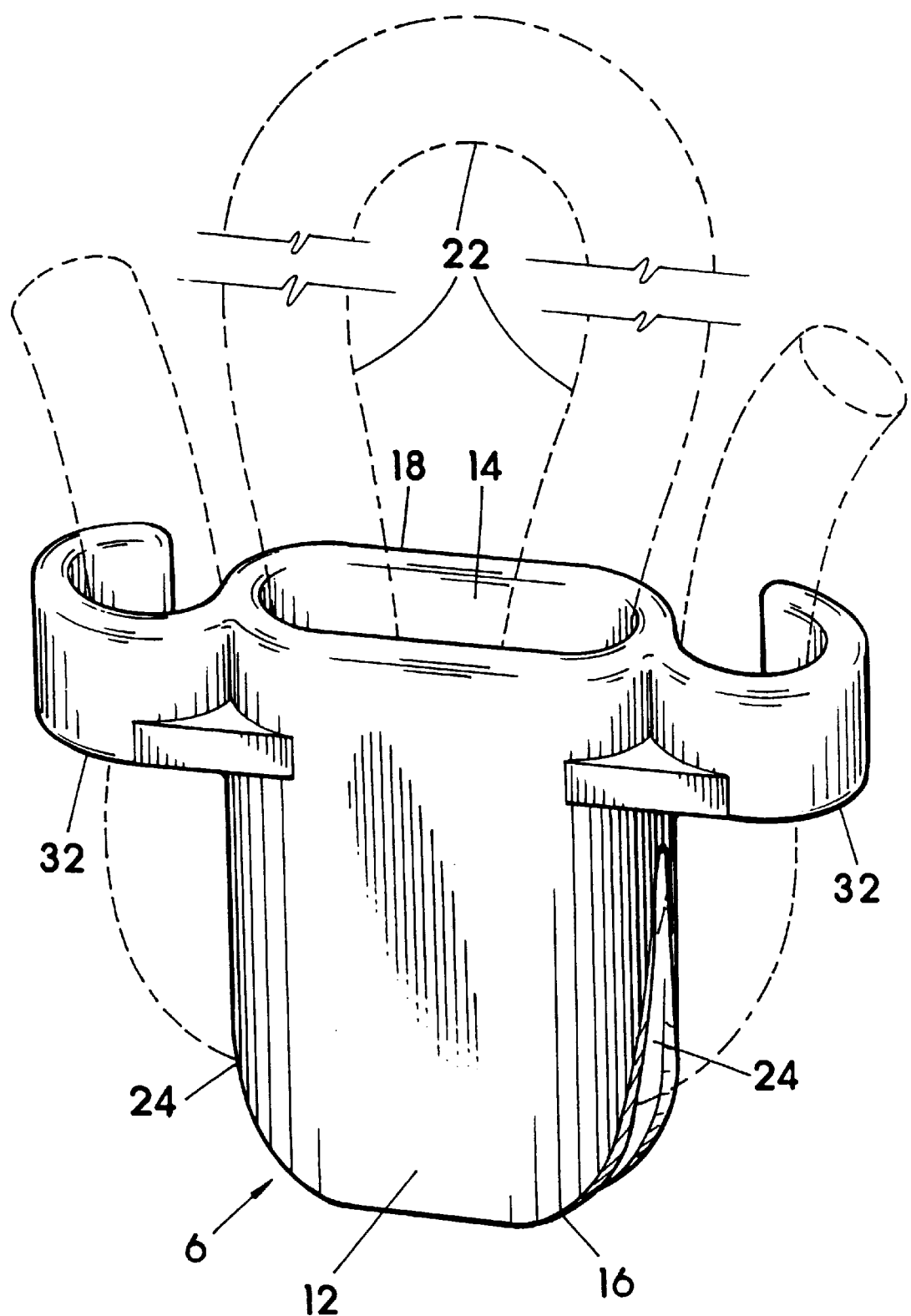
FIG. 20 shows another embodiment in accordance with the invention and similar to the FIG. 19 embodiment but absent a center divider wall in the tubular body.
Figure 21:
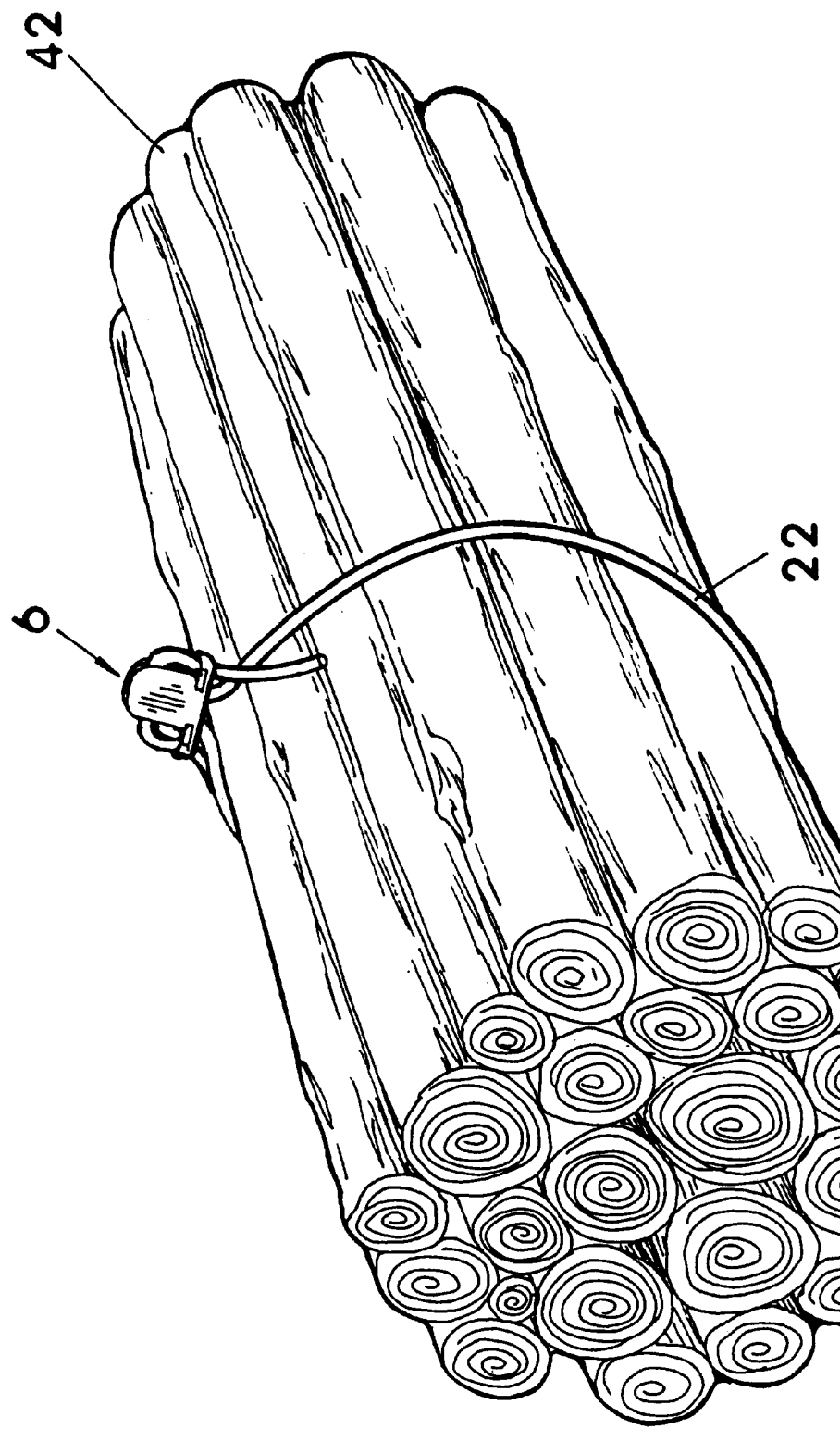
FIG. 21 illustrates the embodiment of FIG. 19 or 20 in use for bundling items together.

Embodiment 6 shown in FIG. 20 is fitting embodiment 1 with a second like fitting embodiment 1 attached thereto using any suitable attachment means but not in an end-for-end reversed or flipped relationship as in FIG. 18. This embodiment 6 demonstrates elimination of a center divider as exists in embodiment 5 between two bodies 12 and allows a folded in-two rope or fold loop thereof to be inserted through the body 12 of embodiment 6. Embodiment 6 can be used in connecting two ropes or rope ends together, or for defining a lockable loop in a rope 22 such as for bundling items 42 such as shown in FIG. 21.

Figures 22, 23:
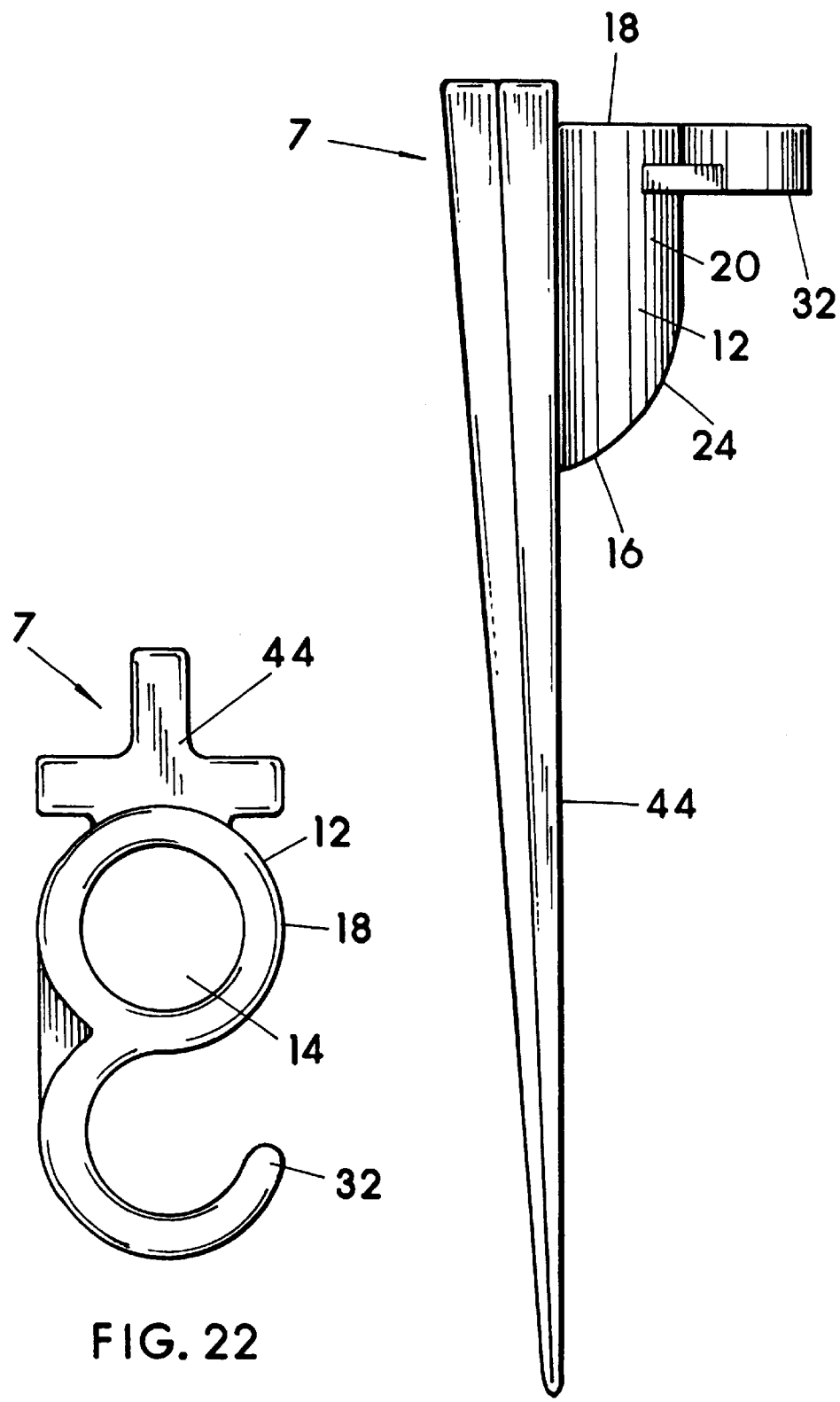
FIG. 22 is a end view of a tent stake or ground stake embodiment in accordance with the present invention.
FIG. 23 is a side view of the tent stake or ground stake embodiment of FIG. 22 in accordance with the invention and using the fitting embodiment of FIGS. 1–9.

Embodiment 7 shown in FIGS. 22–23 is fitting embodiment 1 connected to a tent stake or ground stake 44. FIG. 22 is a top end view of the stake 44 with fitting in accordance with the invention, and FIG. 23 is a side view thereof. The stake 44 is sufficiently rigid to can be driven into the ground and a rope secured thereto. The stake 44 and rope fitting can be integrally molded or cast of plastics or metal as just one of many processes useful to make the embodiment 7.

Figure 24:
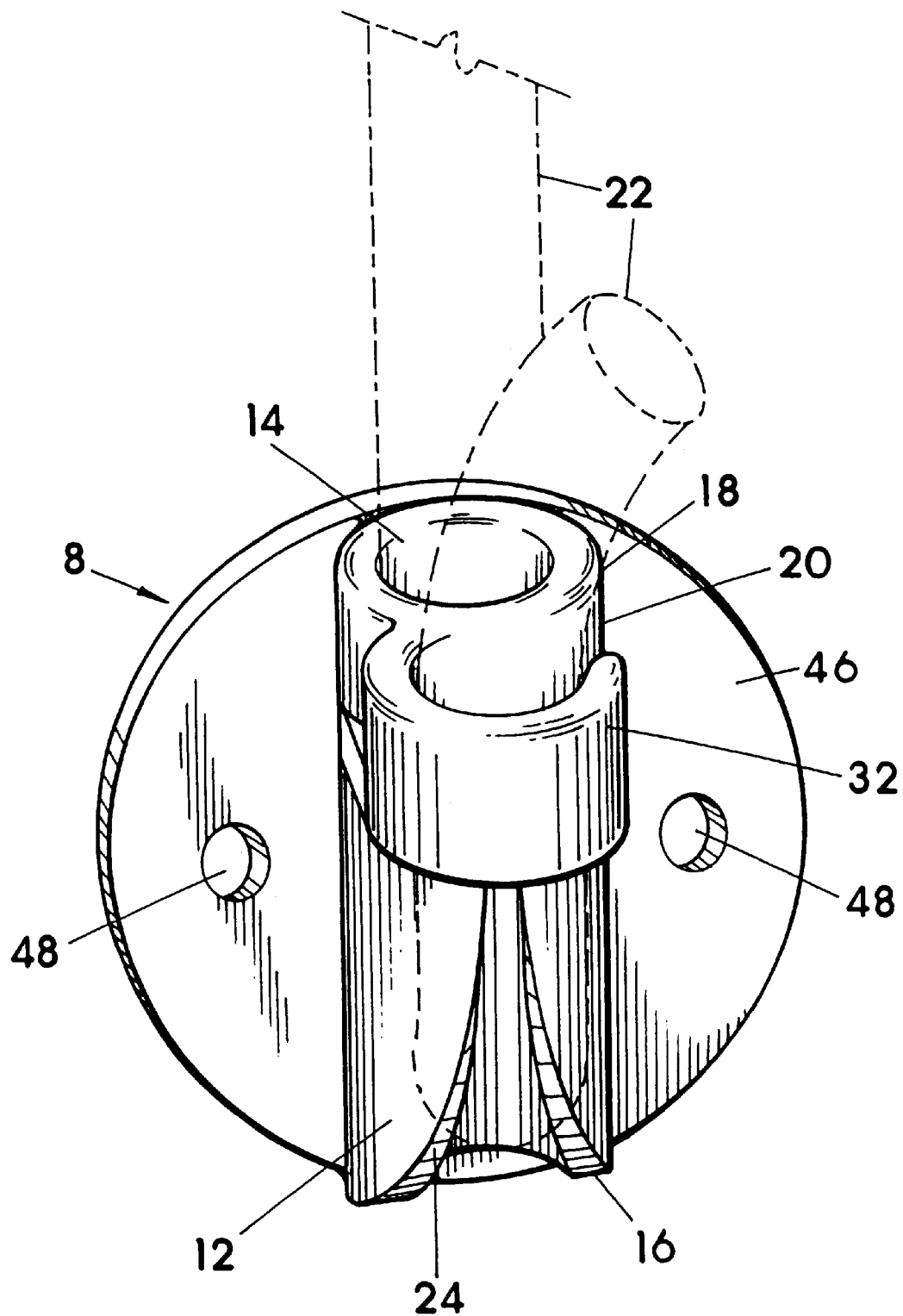
FIG. 24 is another embodiment in accordance with the present invention using the fitting embodiment of FIGS. 1–9 secured to a mounting plate attachable to a surface.

Embodiment 8 shown in FIG. 24 is fitting embodiment 1 connected to a mounting plate 46, the mounting plate 46 being securable stationary to a surface (just about any surface) to hold the rope fitting 1 stationary relative to the surface. Holes 48 are shown through plate 46 to allow attaching the plate to a surface with screws or bolts or the like, although adhesive or welding or the like attachment arrangements can certainly be utilized to attach the plate 46 to a surface. Plate 46 can be flat on its back surface or it can be arcuate in shape on the back side thereof for improved fitting and connection to round pipe and the like, and the rope fitting 1 can be secured stationary to the plate 46 or rotatably attached such as with an axle if desired to allow the fitting to adjust to the pulling direction of a rope connected thereto.

Figure 26:
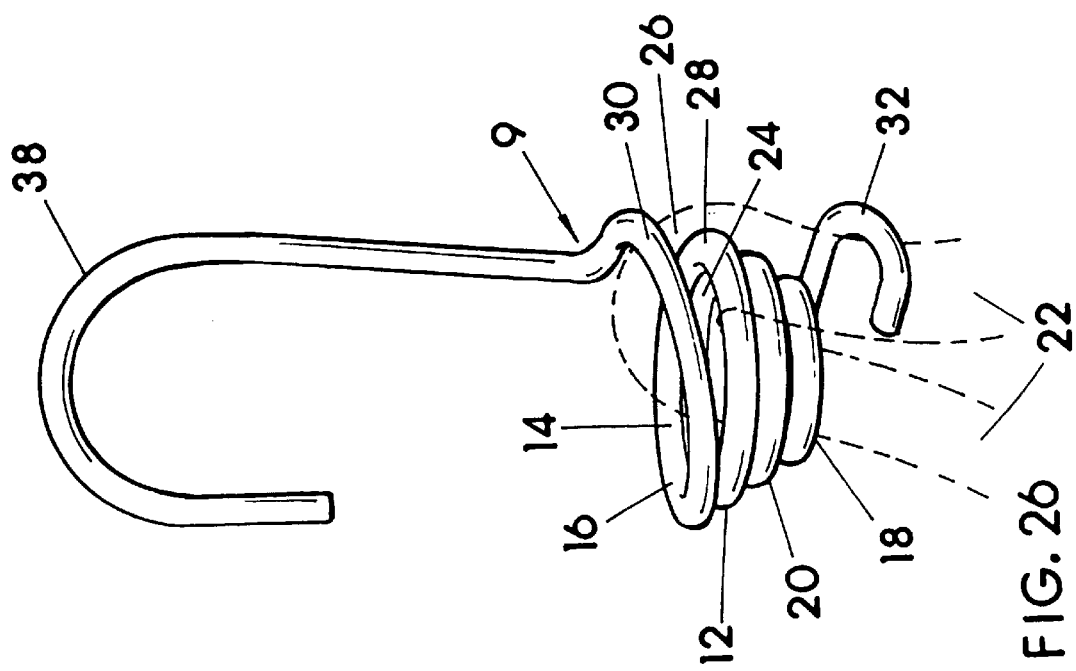
FIG. 26 is another wire formed embodiment of the present invention similar to the FIG. 25 embodiment but having the rope holding structure curved in the opposite direction.

Embodiment 9 shown in FIGS. 25 and 26 is the wire formed embodiment of the present invention and above described and shown in these drawings sufficient to allow those skilled in the art to make and use the embodiment. The rope holding structure 32 in this embodiment is exemplified as a hook, and this hook (holding structure 32), particularly the one shown in FIG. 25 facing outward from body 12 can be sized and shaped to fit tightly on rope 22 so that the rope must be in effect snapped into the hook (structure 32) wherein it is frictionally held. Passage 14 of embodiment 9 can be basically a single diameter if desired, or as can be seen in FIGS. 25–26, passage 14 defined by annular wall 20 can be of a smaller diameter at the second end 18 and larger diameter at the first end 16 allowing a knot or the like enlargement on the terminal end of a rope 22 passed through passage 14 to be unable to be pulled back completely through the body 12 but allowing the knot to be pulled into the larger passage opening at first end 16 to in effect secure the tubular body 12 from sliding any further and off of the rope.

Figure 27:
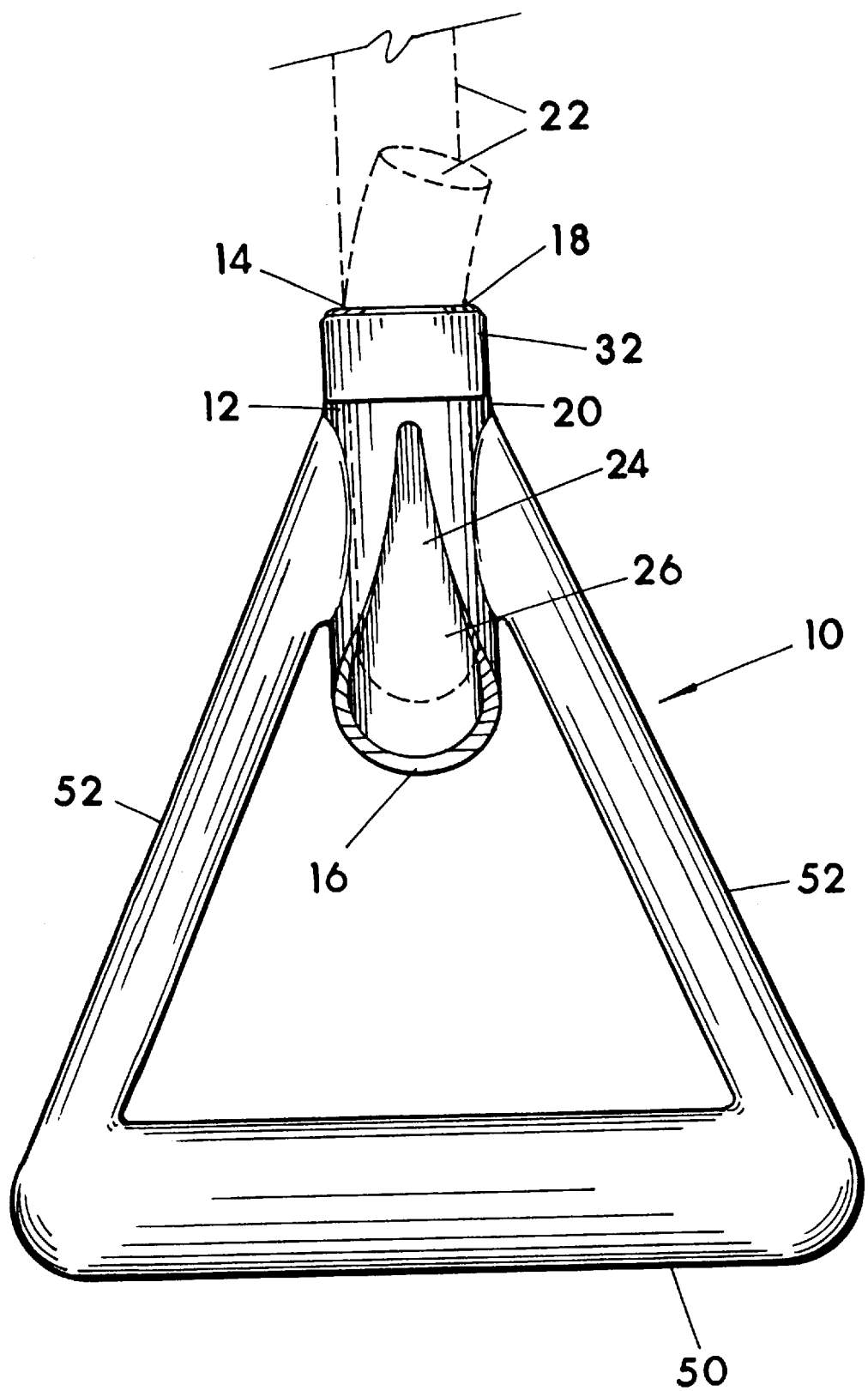
FIG. 27 shows another embodiment of the present invention using the fitting embodiment of FIGS. 1–9 secured to a graspable handle structure.

Embodiment 10 shown in FIG. 27 is fitting embodiment 1 connected to bars 52 supporting a graspable handle 50. This embodiment in effect allows the attachment of a handle to a rope for use in holding or pulling on the rope. Two or more rope attachable fittings in accordance with the invention can be ganged and secured in side-by-side alignment with such a handle arrangement, say for example, to allow the connecting of two or more ropes or rope ends to the handle.

Embodiment 11 shown in FIG. 28 is basically the above first described embodiment of rope fitting using top plate 54 and sans side walls and a bottom plate defining the tubular body 12 of embodiment 1. Anchoring hook structures 38, two parallel and spaced ones are shown, illustrate auxiliary anchoring structures attached to plate 54, and the hooks 38 are shown in a structural arrangement actually providing, because of the hook attaching portions extending along the lateral sides of plate 54 and extending downward therefrom, in effect side walls under the plate 54, however no bottom plate is provided or shown. This embodiment can be dropped onto a rope 22 any place along the rope without having to thread a portion of the rope through a tubular body. From one viewpoint, the rope attachable fitting of FIG. 28 as shown with the hook structures 38 in effect providing side walls can be viewed as a tubular body arrangement with a slot, i.e., the open bottom, through the body (equivalent to a bottomless tubular body 12) wherein the bottom slot allows for the lateral movement of a rope 22 portion into the body absent having to thread a portion of the rope through an otherwise closed sided tubular body 12. A tubular body 12 can also have a full length side slot to also allow lateral movement of the rope into passage 14 if desired. Another principle illustrated in the FIG. 28 drawing is that the rope holding structure 32 can be at least in-part position forward enough to rest over the top of V-shaped notch 24, and this is particularly true if the holding structure 32 is of a type having a slot allowing the rope to be moved thereinto laterally, thereby allowing the user to in a single sweeping motion pull the rope into the V-shaped pinch notch 24 and into the rope holding structure 32 in a single arcing motion to secure the fitting stationary on the rope.

FIGS. 29 and 30 shows another embodiment in accordance with the present invention and primary intended to illustrate the rope holding structure 32 being structured to include a centered top slot between two curved interfacing spaced walls on the exterior of tube 12 for lateral passage of the rope therethrough, the slot in the rope holding structure 32 is defined to be normally narrower than the rope and the rope is either an elastic rope which can be pulled and stretched to cause thinning in the rope diameter and passed through the slot wherein the stretching force is then relieved and the rope expands to a normal diameter wider than the slot and thus remains captured, or alternatively the walls of the rope holding structure 32 adjacent the central slot (see FIGS. 29 and 30) are flexible and resilient and can spread with a rope pressed firmly thereagainst to allow entrance of the rope and then the curved walls (see FIG. 29) spring back under inherent resiliency toward one another to define a slot width less than the normal diameter of the now capture rope. An anchoring hook 38 is shown in FIG. 29 as an example of an auxiliary anchoring structure, although other auxiliary anchoring structures can also be attached to the fitting for attachment to a rope.

Although I have very specifically described preferred structures and use of the invention, it should be understood that the specific details are given for example to those skilled in the art. Changes in the specific structures described may clearly be made without departing from the scope of the invention, and therefore it should be understood that the scope of the invention is not to be strictly limited by the specification and drawings given for example, but is to be determined by the broadest reasonable interpretation of the appended claims.

I claim:

1. A fitting for attachment to a rope, said fitting comprising:
   an elongate tube having a first end and an oppositely disposed second end; said tube having a lengthwise passage for receiving a rope through said tube;
   a rope pinching slot through a side of said tube for receiving a portion of a rope angling and exiting from within said passage and for frictionally restraining the angling portion of the rope in said rope pinching slot; said rope pinching slot including a wider mouth portion tapering to a narrower portion;

a rope holding hook secured to said tube and extending laterally outward from an exterior surface of said tube, said rope holding hook positioned extending outward over generally the same side of said tube through which said rope pinching slot extends, said rope holding hook sized for receiving and holding a portion of a rope adjacent to the exterior of said tube, whereby a rope retrained by said rope pinching slot can be further angled into a tighter curvature and located in part within said rope holding hook and thereby held curved in the tighter curvature.

2. A fitting for attachment to a rope according to claim 1 wherein said rope holding hook includes a structure having a passage and having a lateral entrance slot for allowing a portion of a rope to be inserted through said entrance slot and positioned within said passage of said structure.

3. A fitting for attachment to a rope according to claim 2 further including an attached auxiliary anchoring structure for use in anchoring said fitting to an item.

4. A fitting for attachment to a rope according to claim 3 wherein said auxiliary anchoring structure is an anchoring hook: and said tube, said rope holding hook and said anchoring hook comprise formed wire.

5. A fitting for attachment to a rope according to claim 3 wherein said auxiliary anchoring structure is an anchoring plate mountable to a surface.

6. A fitting for attachment to a rope according to claim 3 wherein said auxiliary anchoring structure is a ground stake.

7. A fitting for attachment to a rope according to claim 3 wherein said auxiliary anchoring structure is a handle.

8. A fitting for attachment to a rope, said fitting comprising:

- an elongate tube having a passage therethrough for allowing insertion of a rope through said tube so as to have said tube over a length of the rope;
- an auxiliary anchoring structure attached to said tube for use in anchoring said tube to a relatively stationary item;
- a tapering slot defined through a wall of said tube, said slot having a mouth open through a first end of said tube and tapering in width from said mouth in extension toward a second end of said tube;
- rope holding means on an exterior surface of said tube positioned adjacent said tapering slot and sized for receiving and holding a portion of a rope exiting said tube through said tapering slot; whereby a rope in part within said passage of said tube can be curved to place a curved portion of the rope within the tapering slot and with the rope extending therefrom into said rope holding means so as to be held in tight curvature.

9. A fitting for attachment to a rope according to claim 8 wherein said tube is formed of wire coiled to form said tube and said tapering slot is a crack between wire coils of the coiled wire with the crack having an opening at a first end of the tube; said auxiliary anchoring structure is a hook structure fashioned of a portion of the wire extending outward beyond said tube; and said rope holding means includes a structure fashioned of a portion of the wire extending outward at a second end of the tube.

10. A fitting for attachment to a rope according to claim 8 wherein said auxiliary anchoring structure is an anchoring hook.

11. A fitting for attachment to a rope according to claim 8 wherein said auxiliary anchoring structure is an anchoring plate mountable to a surface.

12. A fitting for attachment to a rope according to claim 8 wherein said auxiliary anchoring structure is a ground stake.

13. A fitting for attachment to a rope according to claim 8 wherein said auxiliary anchoring structure is a handle.

14. A fitting for attachment to a rope according to claim 8 wherein said auxiliary anchoring structure is a second tube attached to a bottom lengthwise side of said tube of said fitting, said second tube having a first end and an oppositely disposed second end; a rope passage through said second tube for allowing a rope to be inserted through said second tube; a tapering slot defined in a wall of said second tube, said slot of said second tube having a mouth open through said first end of said second tube and tapering in width from said mouth in extension toward said second end of said second tube; rope holding means attached to an exterior surface of said second tube for receiving and holding a portion of a rope.

15. A fitting for attachment to a rope according to claim 14 wherein the first and second ends of said second tube are positioned in opposite relation to the first and second ends of said tube of said fitting.

16. A fitting for attachment to a rope according to claim 14 wherein the first and second ends of said second tube are positioned adjacent to the first and second ends respectively of said tube of said fitting.

17. A rope fitting comprising:

- a plate having a top surface and an oppositely disposed bottom surface;
- rope pinching slot means extending through said plate between said top surface and said bottom surface for allowing a portion of a rope to extend from below said bottom surface to above said top surface and for frictionally restraining the rope in said rope pinching slot means at a first restraining location for aiding in holding said rope in an approximate 180 degree bent back condition;
- rope holding means attached to said plate for receiving and holding a portion of the bent back rope at a second restraining location adjacent to said top surface of said plate for aiding in holding the rope in the approximate 180 degree bent back condition.

18. A fitting for attachment to a rope according to claim 17 further including an auxiliary anchoring structure attached to walls connected to said plate for use in anchoring said plate to an item.

19. A fitting for attachment to a rope according to claim 18 wherein said auxiliary anchoring structure is an anchoring hook and said plate and said walls together define a tubular body of said fitting.

20. A fitting according to claim 19 wherein the fitting is formed of molded plastics.

* * * * *